(12) United States Patent
Boldrini

(10) Patent No.: US 12,469,978 B2
(45) Date of Patent: Nov. 11, 2025

(54) METHOD AND MACHINE TO ASSEMBLE A TRANSPONDER PROVIDED WITH A HELICAL ANTENNA IN A COMPONENT OF AN ARTICLE

(71) Applicant: G.D SOCIETA' PER AZIONI, Bologna (IT)

(72) Inventor: Fulvio Boldrini, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 120 days.

(21) Appl. No.: 18/580,963

(22) PCT Filed: Jul. 21, 2022

(86) PCT No.: PCT/IB2022/056745
§ 371 (c)(1),
(2) Date: Jan. 19, 2024

(87) PCT Pub. No.: WO2023/002426
PCT Pub. Date: Jan. 26, 2023

(65) Prior Publication Data
US 2025/0105522 A1    Mar. 27, 2025

(30) Foreign Application Priority Data

Jul. 23, 2021 (IT) .......... 102021000019685
Jul. 30, 2021 (IT) .......... 102021000020465

(51) Int. Cl.
*H01Q 11/08* (2006.01)
*H01Q 1/22* (2006.01)
*H01Q 1/36* (2006.01)

(52) U.S. Cl.
CPC .............. *H01Q 11/08* (2013.01); *H01Q 1/36* (2013.01)

(58) Field of Classification Search
CPC ...... H01Q 1/22; H01Q 1/2208; H01Q 1/2283; H01Q 1/36; H01Q 11/08; B21F 3/00;
(Continued)

(56) References Cited

U.S. PATENT DOCUMENTS

| 4,306,646 | A | * | 12/1981 | Magni | .................... | B23Q 11/00 198/346.2 |
| 2004/0211058 | A1 | * | 10/2004 | Hansson | ................. | H01F 41/09 29/601 |

(Continued)

FOREIGN PATENT DOCUMENTS

| JP | 2004-318303 A | 11/2004 |
| WO | WO-2020/011565 A1 | 1/2020 |

OTHER PUBLICATIONS

International Application No. PCT/IB2022/056745, International Search Report and Written Opinion, mailed Oct. 5, 2022.

*Primary Examiner* — Thai Pham
(74) *Attorney, Agent, or Firm* — MARSHALL, GERSTEIN & BORUN LLP

(57) ABSTRACT

Method and machine to assemble a transponder (9) provided with a helical antenna (11) in a component (1) of an article. The following are provided: a main conveyor (15) which is designed to move, along an assembling path (P) a carriage (16) carrying at least one seat (18) designed to house the component (1); an input station (S1), which is arranged along the assembling path (P) and is configured to place the component (1) in the seat (18) of the carriage (16); a feeding station (S4), which is arranged along the assembling path (P) downstream of the input station (SI) and is configured to couple an integrated circuit (10) provided to two electrical contacts (12) to the component (1); a winding station (S5), which is arranged along the assembling path (P) downstream of the feeding station (S4) and is configured to wind an externally insulated conductor wire (13) around the compo- (Continued)

nent (1) in order to obtain a series of turns making up the helical antenna (11); and a welding station (S6), which is arranged along the assembling path (P) downstream of the winding station (S5) and is configured to weld two opposite ends of the helical antenna (11) against the two electrical contacts (12) of the integrated circuit (10).

22 Claims, 16 Drawing Sheets

(58) Field of Classification Search
CPC .......... B21F 3/02; H01F 41/09; H01F 41/096; G06K 19/07732; G06K 19/0775
See application file for complete search history.

(56) References Cited

U.S. PATENT DOCUMENTS

| | | | |
|---|---|---|---|
| 2013/0200164 A1* | 8/2013 | Wendisch | G06K 19/07749 |
| | | | 235/492 |
| 2020/0328662 A1* | 10/2020 | Rissi | H02K 15/08 |
| 2021/0098858 A1* | 4/2021 | Destraves | B60C 23/0493 |
| 2021/0129276 A1 | 5/2021 | Zhu et al. | |

* cited by examiner

METHOD AND MACHINE TO ASSEMBLE A TRANSPONDER PROVIDED WITH A HELICAL ANTENNA IN A COMPONENT OF AN ARTICLE

CROSS-REFERENCE TO RELATED APPLICATIONS

This patent application is a US national stage of International Application No. PCT/IB2022/056745, filed Jul. 21, 2022, which claims the benefit of priority to Italian Patent Applications No. 102021000019685 filed on Jul. 23, 2021 and no. 102021000020465 filed on Jul. 30, 2021, the entire disclosures of which are incorporated herein by reference.

TECHNICAL FIELD

The present invention relates to a method and to a machine to assemble a transponder provided with a helical antenna in a component of an article.

The present invention finds advantageous application in the tobacco industry to assemble a transponder in a component of a disposable cartridge of an electronic cigarette, to which the following disclosure will refer to without loss of generality.

PRIOR ART

Normally, an electronic cigarette comprises a reusable part that is used several times and contains, among other things, an electric battery (which provides the energy necessary for the operation of the electronic cigarette) and an electronic processor that oversees the operation of the electronic cigarette. Furthermore, the electronic cigarette comprises a single use cartridge (namely, disposable that is therefore used only once and is then replaced), which is coupled to the reusable part.

Recently it has been proposed to insert, in each disposable cartridge, a component provided with a transponder provided with a memory in which the characteristics of the disposable cartridge are stored and in particular the characteristics of the active substance (liquid or solid) that must be heated to release the inhalable vapours; in this way, the reusable part of the electronic cigarette can read the characteristics of the disposable cartridge coupled thereto, thus adapting the heating to the characteristics of the disposable cartridge.

DESCRIPTION OF THE INVENTION

The object of the present invention is to provide a method and a machine to assemble a transponder provided with a helical antenna in a component of an article, which method and machine allow to operate at a high operating speed (measured as the number of components produced in a unit of time) while maintaining, at the same time, a high production quality (generally measured as a percentage of defective pieces).

According to the present invention, a method and a machine are provided to assemble a transponder provided with a helical antenna in a component of an article, according to what is claimed in the attached claims.

The claims describe preferred embodiments of the present invention forming an integral part of the present description.

BRIEF DESCRIPTION OF THE DRAWINGS

The present invention will now be described with reference to the attached drawings, which illustrate a non-limiting embodiment thereof, wherein.

PREFERRED EMBODIMENTS OF THE INVENTION

Figure 1:
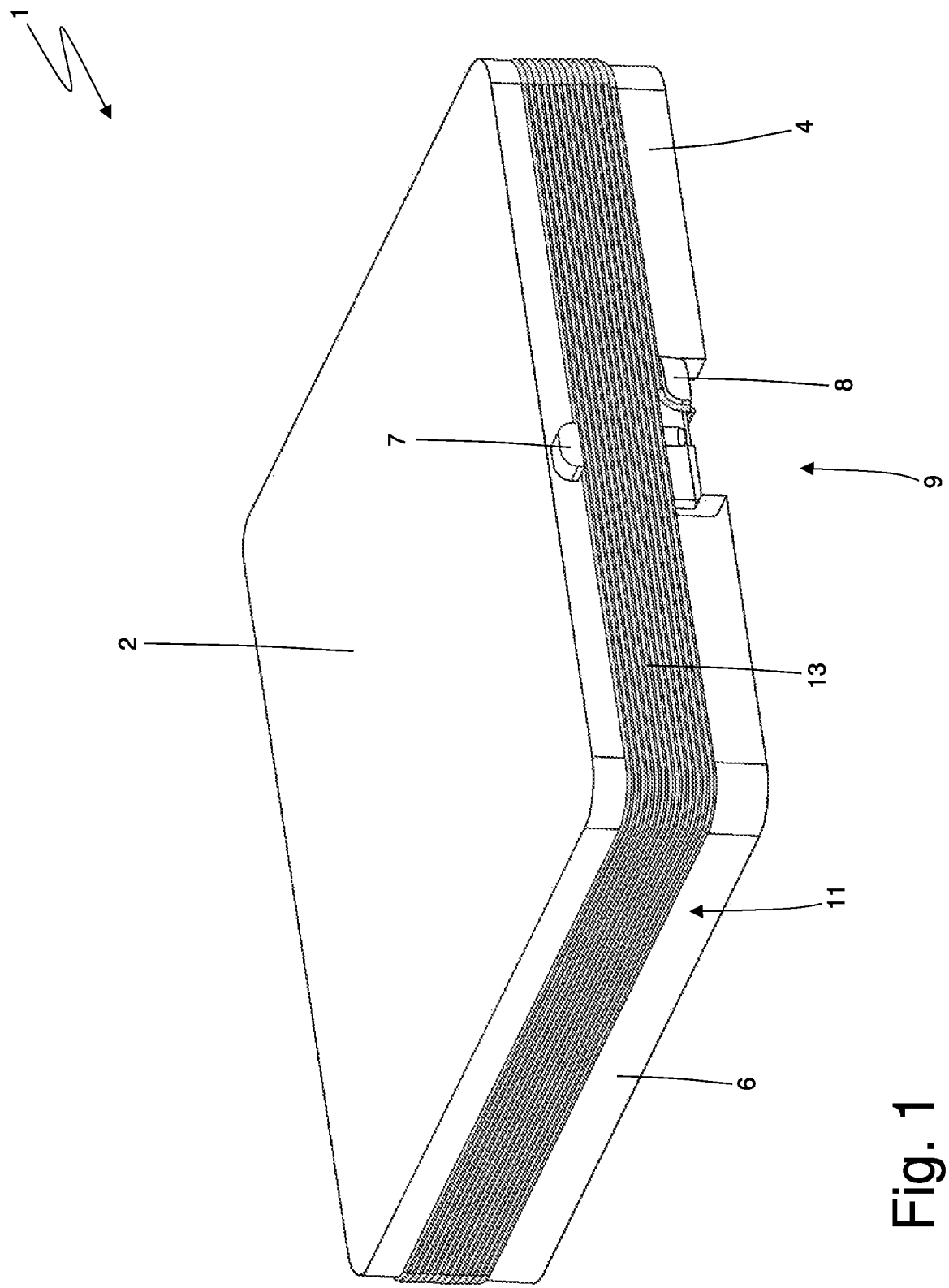
FIGS. 1 and 2 are two different perspective views of a component of a disposable cartridge of an electronic cigarette.
Figure 2:
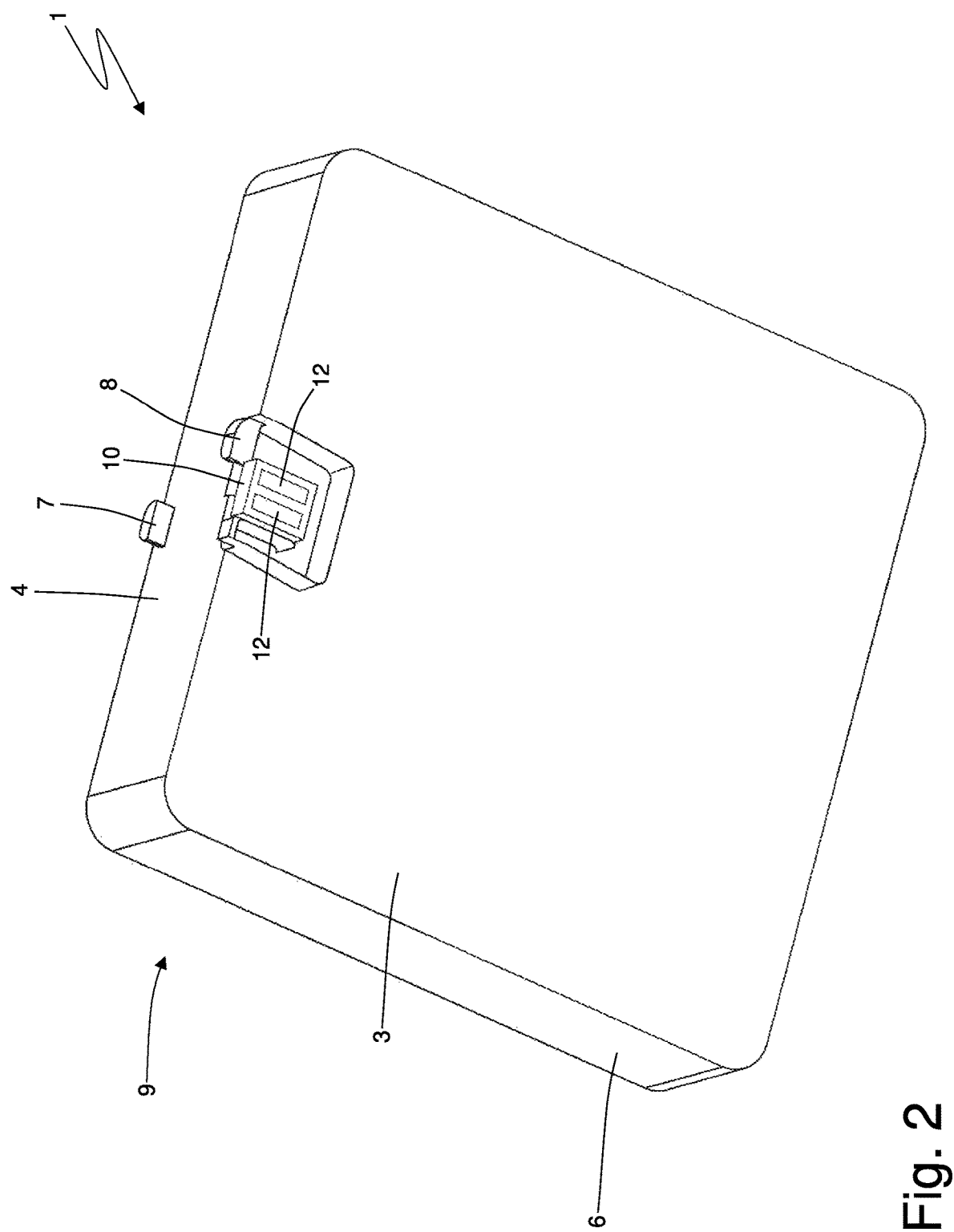

In FIGS. 1 and 2, the reference number 1 denotes as a whole a component of a disposable cartridge of an electronic cigarette.

The component 1 has a roughly parallelepiped shape with six walls (faces): an upper wall 2, a lower wall 3 parallel and opposite to the upper wall 2, a front wall 4, a rear wall 5 parallel and opposite to the front wall 4 and two side walls 6 parallel and opposite to one another.

The component 1 comprises two pins 7 and 8 (namely, two small columns) which in cantilever project manner (i.e., perpendicularly) from the front wall 4; the pin 7 is arranged in the area of an upper edge of the front wall 4 (namely, near the upper wall 2) whereas the pin 8 is arranged in the area of a lower edge of the front wall 4 (namely, near of the lower wall 3). Preferably, the two pins 7 and 8 are not vertically aligned with one another, namely, the two pins 7 and 8 are vertically (slightly) offset from one another.

The component 1 comprises a transponder 9, namely, an electronic device (passive, namely, devoid of its own electrical supply) which is capable of storing information and is capable of communicating via radio frequency. In other words, the transponder 9 is a small-sized "smart label" that is capable of responding to remote interrogations by means of suitable fixed or portable devices, known as readers (or also interrogators); a reader is able to read and/or modify the information contained in the transponder 9 that is interrogating by communicating with the transponder 9 by radio frequency. Consequently, the transponder 9 is part of a wireless reading and/or writing system operating according to the so-called RFID technology ("Radio-Frequency IDentification").

The transponder 9 comprises an integrated circuit 10 (i.e., a microchip) provided with a non-volatile memory (typically EEPROM or FRAM) and an antenna 10 connected to the integrated circuit 10; in particular, the integrated circuit 10 has two electrical contacts 12 to which two ends of the antenna 11 are welded.

The antenna 11 is wound and is formed by a plurality of turns of an externally insulated conductor wire 13 that form a coil; in the embodiment illustrated in the attached figures about 10-15 turns are provided. The conductor wire 13 is wound around the walls 4, 5 and 6 of the component 1 whereas the integrated circuit 10 is arranged in a housing obtained in the lower wall 3 of the component 1 (as illustrated in FIG. 2). According to a different embodiment not illustrated, the integrated circuit 10 is arranged in a housing obtained in the front wall 4 of the component 1 (and therefore is at least partially covered by the antenna 11 which is also wound over the front wall 4).

In use, the antenna 11 receives an electromagnetic signal which, by electromagnetic induction, induces an electric potential difference in the antenna 11 which generates the circulation of an electric current in the integrated circuit 10 for supplying the integrated circuit 10; the integrated circuit 10 thus activated transmits the data contained in its memory via the antenna 11 and possibly also modifies the data contained in its memory.

Figure 3:
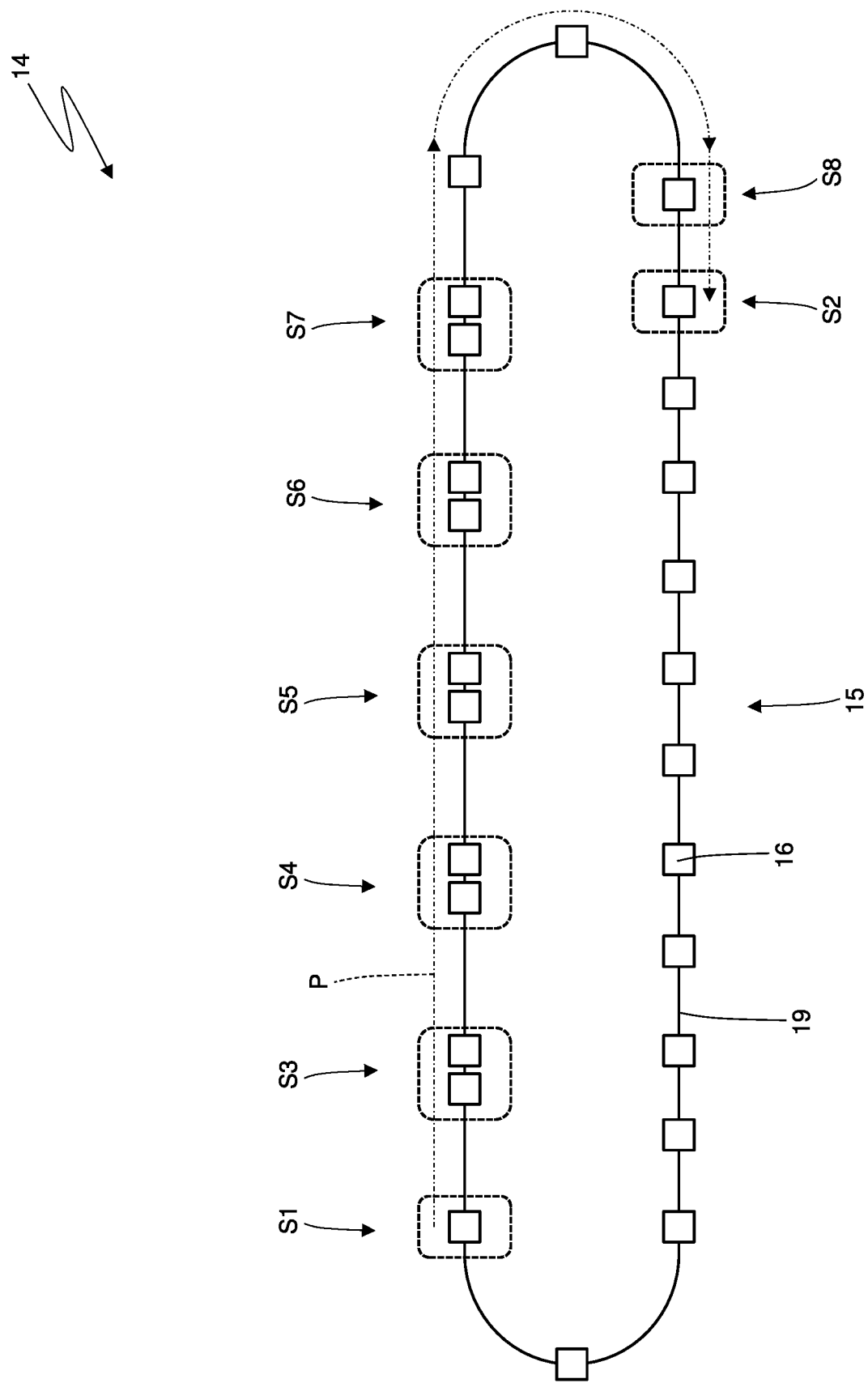
FIG. 3 is a schematic view of a machine that produces the component of FIGS. 1 and 2 and is made according to the present invention.
Figure 4:
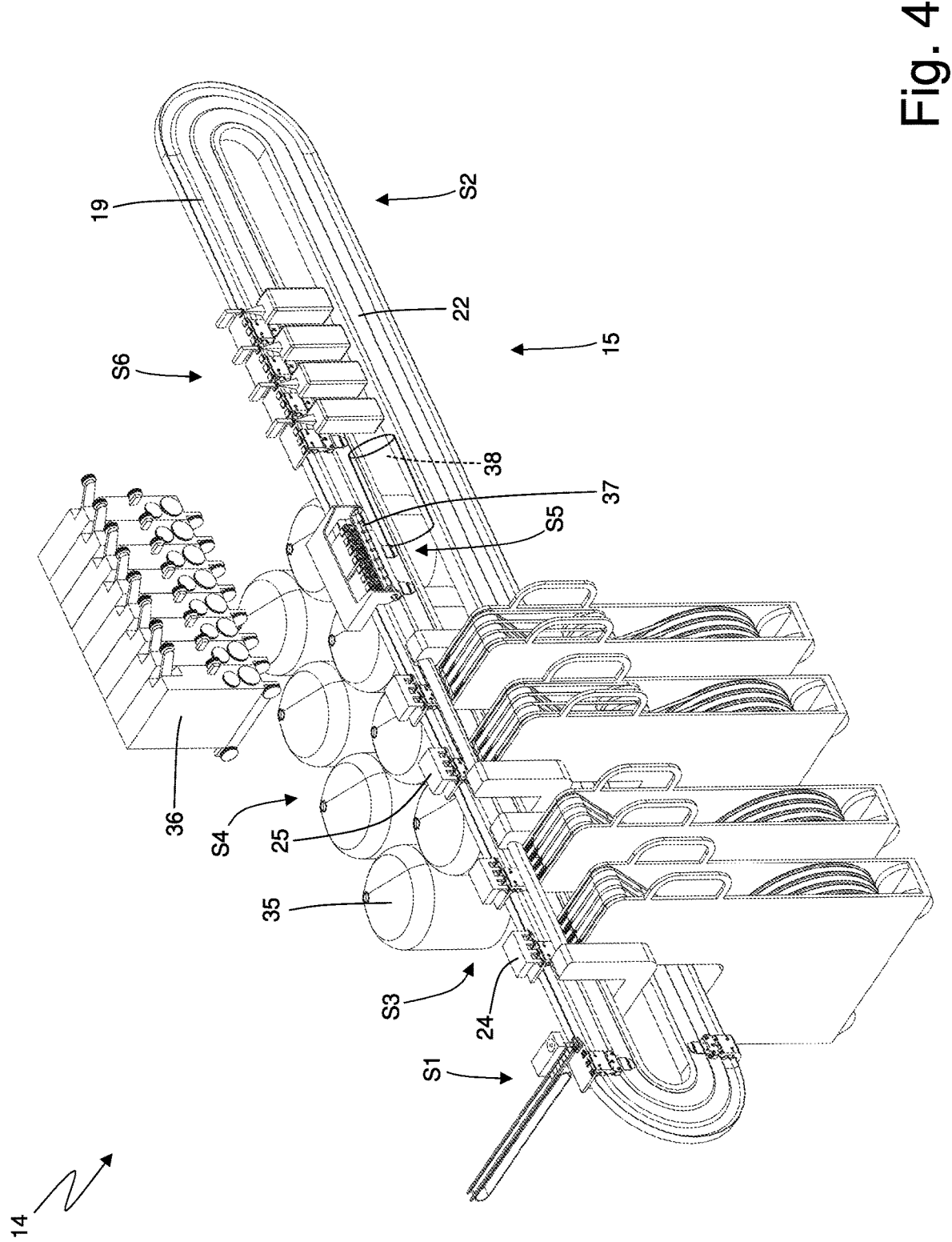
FIG. 4 is a perspective view and with the removal of parts for clarity of the machine of FIG. 3.

In FIGS. 3 and 4, the reference number 14 denotes as a whole a machine for the assembly of the component 1.

The machine 14 comprises a support body (i.e., a frame) which rests on the ground by means of legs and has a vertical wall on the front on which the operating members are mounted. Furthermore, the machine 14 comprises a main conveyor 15 which moves the components 1 being processed along an assembling path P, which develops between an input station S1 (where the main conveyor 15 receives the components 1 to be completed or assembled) and an output station S2 (where the main conveyor 15 transfers the complete or assembled components 1).

The assembling path P passes through a series of stations S3-S8 (better described in the following), in which assembly operations are performed on the components 1 in transit. In particular, the assembling path P comprises: an upper section which is horizontal and linear (namely, which extends substantially along a straight line arranged horizontally) arranged between the input station S1 and the station S7, a lower section which is horizontal and linear (therefore it is parallel to the upper section) arranged between the station S8 and the output station S2, and a semi-circular connecting section that connects the upper section and the lower section to one another.

Figure 5:
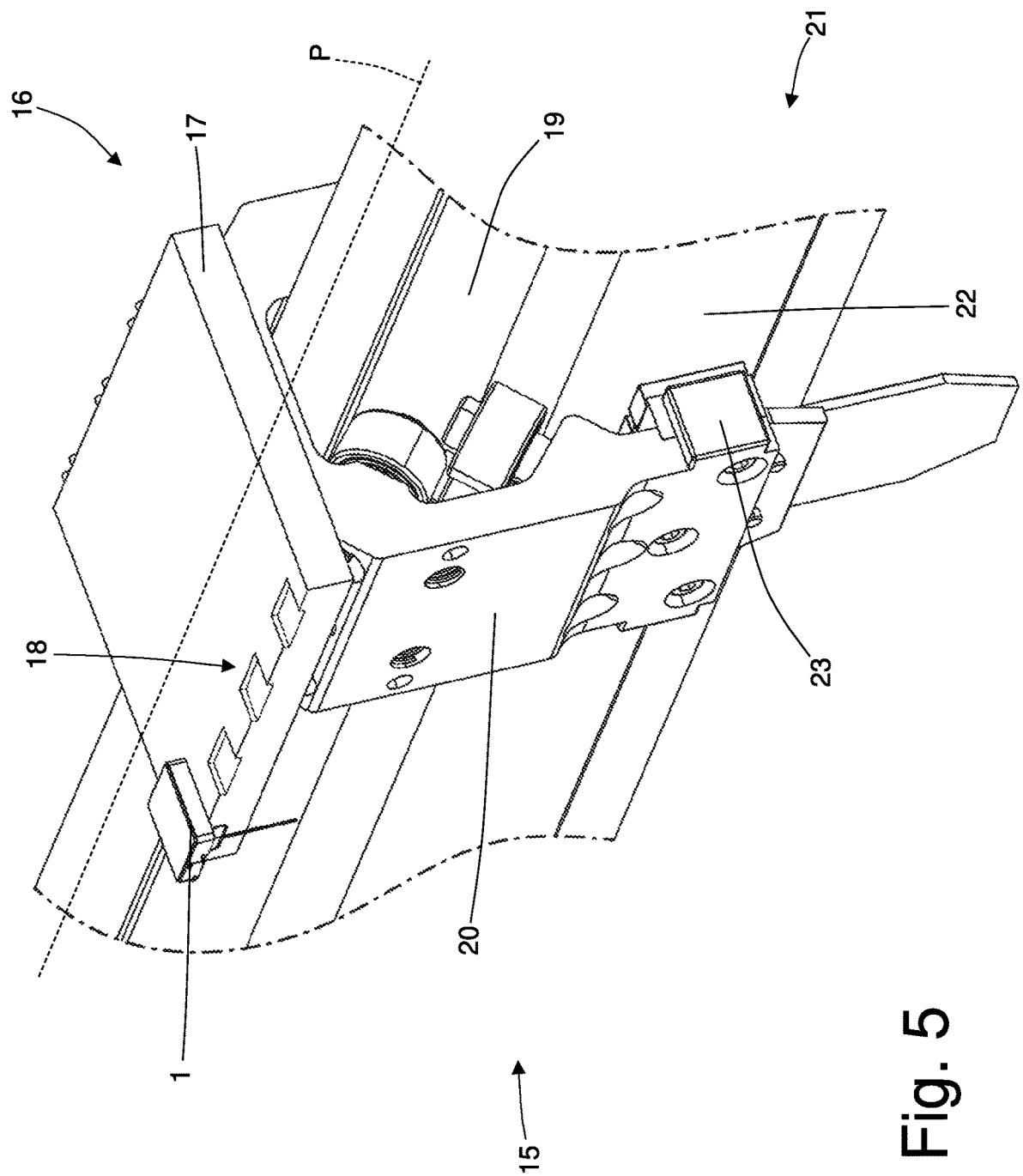
FIG. 5 is a perspective view of a carriage of a main conveyor of the machine of FIG. 3.
Figure 6:
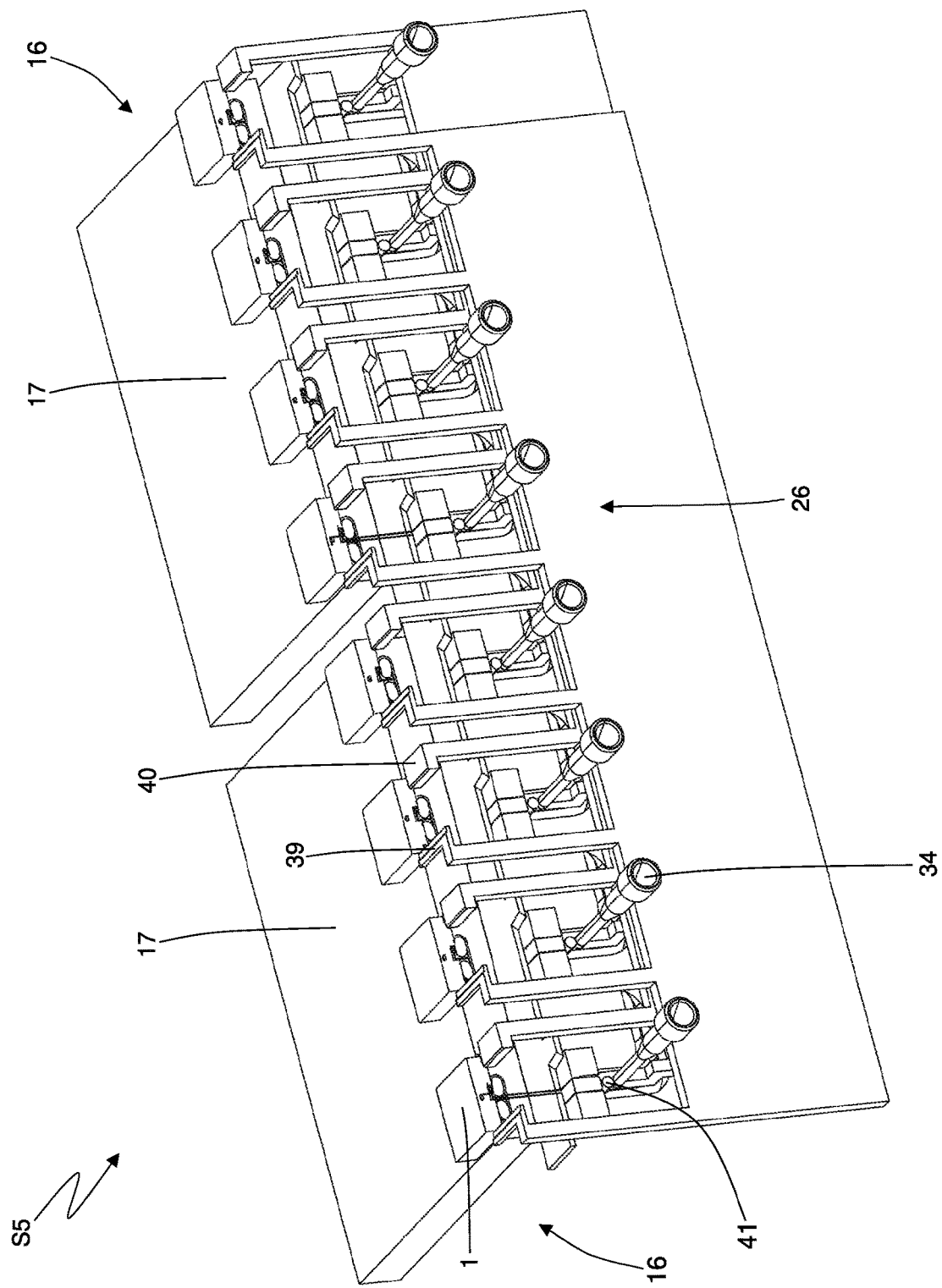
FIGS. 6-10 are respective perspective views and with the removal of parts for clarity of a winding station of the machine of FIG. 3.
Figure 7:
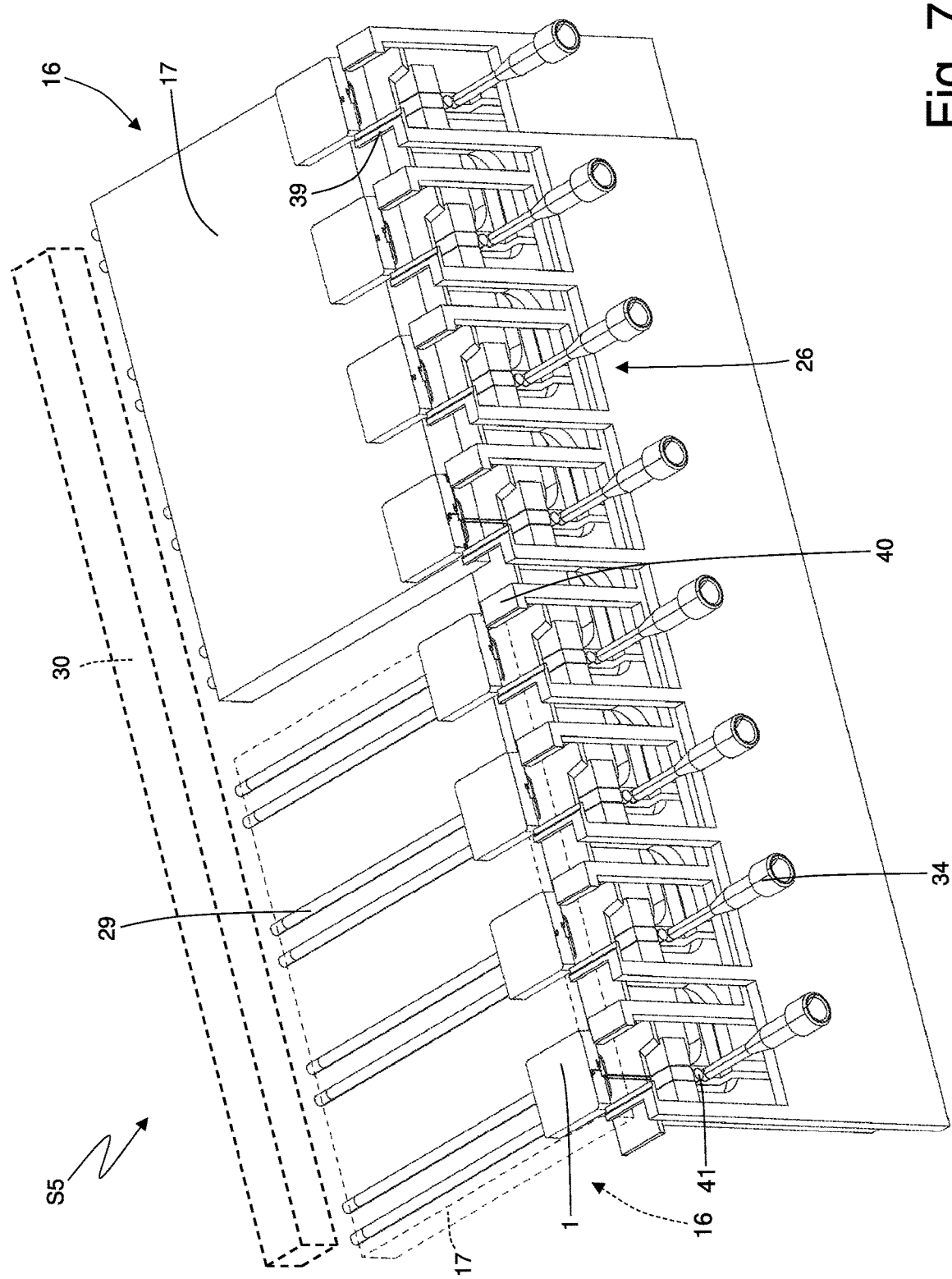
Figure 8:
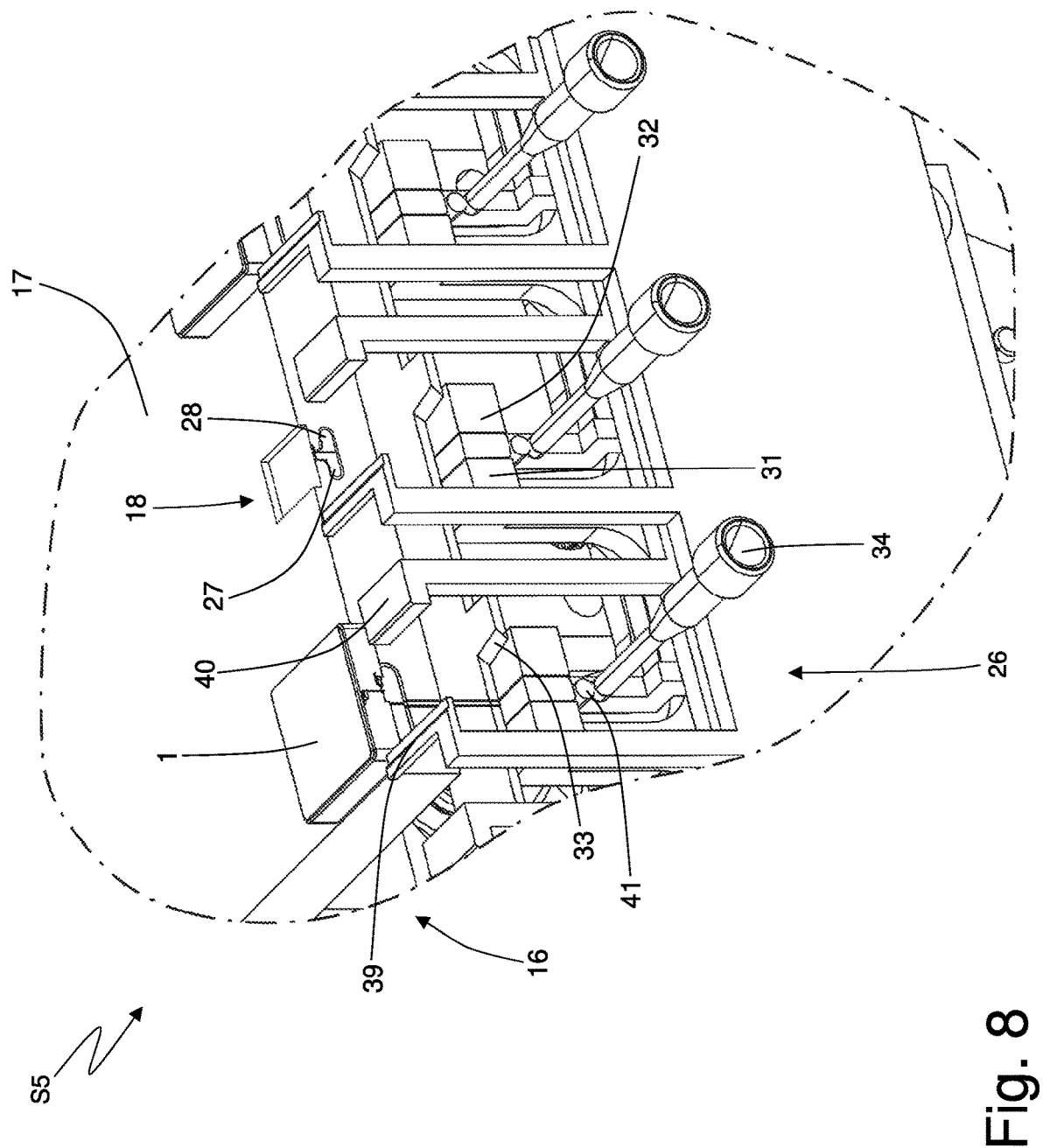
Figure 9:
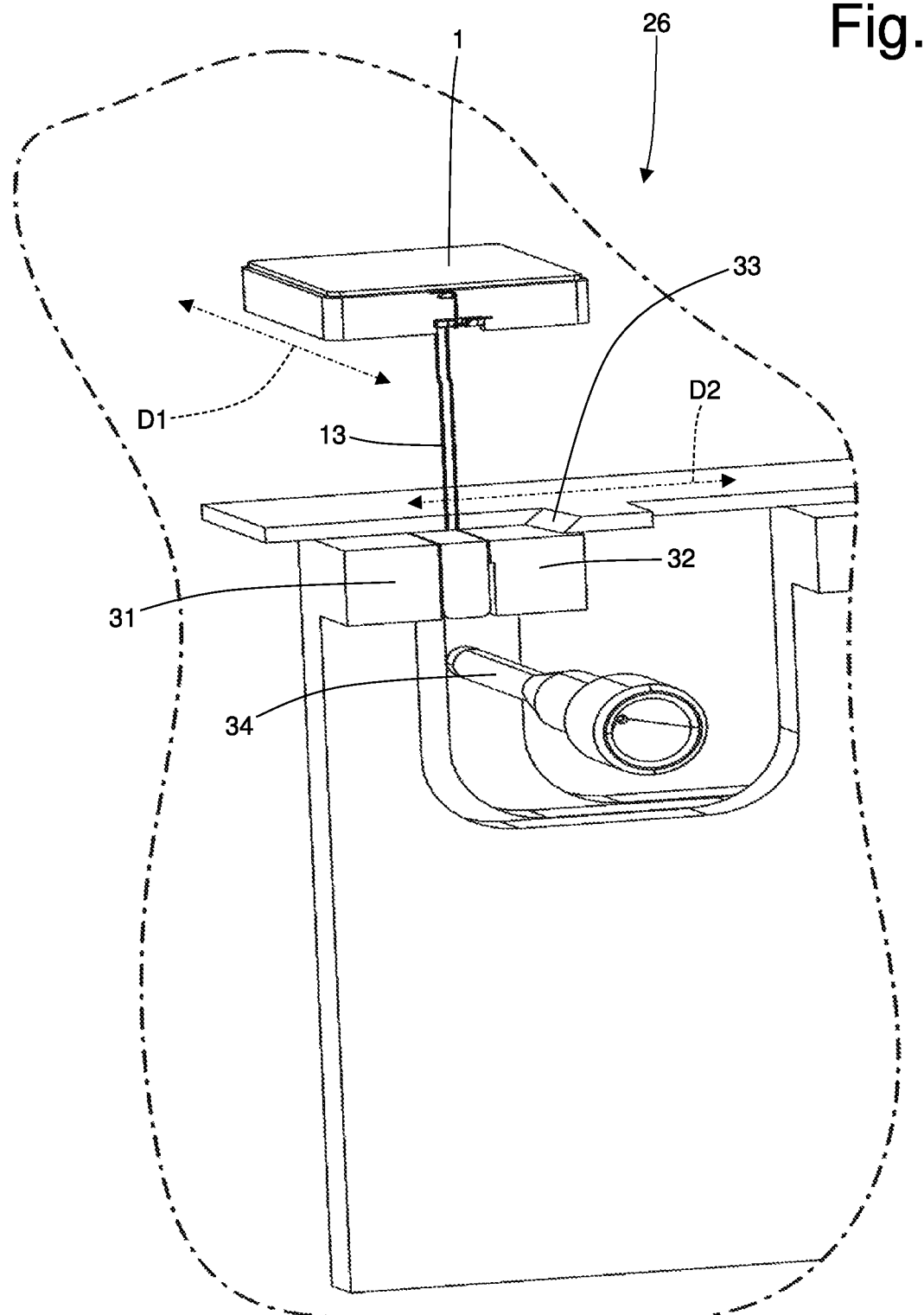

The main conveyor 15 comprises a plurality of carriages 16 which are moved along the assembling path P; as better illustrated in FIG. 5, each carriage 16 comprises a support plate 17 in which four seats 18 are made, each suitable for receiving and housing a corresponding component 1 (namely, each seat 18 reproduces in negative the shape of at least a part of the component 1 to house the component 1 without appreciable clearance). Obviously, the number of seats 18 obtained in the support plate 17 of a carriage 16 could be different from four (generally from a minimum of one to a maximum of seven-eight seats 18).

The main conveyor 15 is designed to cyclically move each carriage 16 along the assembling path P with an intermittent movement (in a step-like manner) that provides for cyclical alternation of movement steps in which the main conveyor 15 moves the carriages 16 and stop steps in which the main conveyor 15 keeps the carriages 16 stationary. According to what is illustrated in FIG. 5, the main conveyor 15 comprises an annular guide 19 (namely, closed in a loop on itself) which is arranged in a fixed position along the assembling path P; in particular, the annular guide 19 is formed by a single fixed track (i.e., motionless) which is arranged along the assembling path P. Furthermore, the main conveyor 15 comprises a plurality of slides 20, each supporting a corresponding carriage 16 and is coupled to the guide 19 to slide freely along the guide 19. Finally, the main conveyor 15 comprises a linear electric motor 21 which moves the slides 20 carrying the carriages 16 along the assembling path P; the linear electric motor 16 comprises an annular stator 22 (i.e., a fixed primary) which is arranged in a fixed position along the guide 19 and a plurality of movable movable secondaries), each electro-sliders 23 (i.e., magnetically coupled to the stator 22 so as to receive, from the stator 22, a driving force and is rigidly connected to a corresponding slide 20.

According to a different embodiment not illustrated, the main conveyor 15 is a belt conveyor and comprises (at least) a flexible belt which supports the carriages 16 and is closed in a loop around two end pulleys (at least one of which is motorized).

As illustrated in FIGS. 3 and 4, at the beginning of the assembly cycle the main conveyor 15 moves a carriage 16 (carrying four seats 18) along the assembling path P to stop a single carriage 16 in the input station S1 where four components 1 (to be assembled or to be completed) are arranged in the corresponding four seats 18 of the carriage 16; in the input station S1 and during the feeding of the components 1, the main conveyor 15 slightly moves each carriage 16 so as to align each seat 18 of the carriage 16 in succession with an input conveyor that extends perpendicular to the assembling path P and originates from a vibrating plate.

Subsequently, the main conveyor 15 moves a carriage 16 (carrying four seats 18) along the assembling path P and from the input station S1 to the application station S3 (arranged between the input station S1 and the feeding station S4), where the carriage 16 stops and in which an adhesive means is applied to each component 1 carried by the carriage 16 (for example one or more drops of glue or a double-sided adhesive strip) suitable to make the integrated circuit 10 adhere to the component 1. According to a preferred embodiment, in the application station S3 two twin and redundant application units are provided which are used alternatively so that one application unit can be used while the other is stopped for restoration/maintenance/cleaning/standby.

Subsequently, the main conveyor 15 moves a carriage 16 (carrying four seats 18) along the assembling path P and from the application station S3 to the feeding station S4 (arranged downstream of the input station S1), where the carriage 16 stops and in which an integrated circuit 10 provided with the two electrical contacts 12 is coupled to each component 1 carried by the carriage 16. According to a preferred embodiment, in the feeding station S4 two twin and redundant feeding units are provided which are used alternatively so that one feeding unit can be used while the other is stopped for restoration/maintenance/cleaning/standby.

According to a different embodiment not illustrated, each integrated circuit 10 is simply inserted by interlocking into a corresponding seat obtained in the respective component 1 without the need to apply the adhesive means; consequently, in this embodiment the application station S3 is not provided as it is no longer necessary.

Subsequently, the main conveyor 15 moves a carriage 16 (carrying four seats 18) along the assembling path P and from the feeding station S4 to the winding station S5 (arranged downstream of the feeding station S4), where the carriage 16 stops and in which an externally insulated conductive wire 13 is wound around each component 1 carried by the carriage 16 to form a series of turns which form the helical antenna 11. According to a preferred embodiment, the wrapping station S5 is configured to operate with two carriages 16 at a time (namely, with eight components 1 at a time) since the wrapping operation is rather slow (namely, it requires a significant time span to be performed with a high quality).

Subsequently, the main conveyor 15 moves a carriage 16 (carrying four seats 18) along the assembling path P and from the winding station S5 to the welding station S6 (arranged downstream of the winding station S5), where the carriage 16 stops and in which in each component 1 carried by the carriage 16 the two opposite ends of the helical antenna 11 are welded (for example by ultrasound or by laser) to the two electrical contacts 12 of the integrated circuit 10. According to a preferred embodiment, the winding station S5 is configured to operate with four carriages 16 at a time (namely, with sixteen components 1 at a time) since the equipment necessary for welding is bulky and therefore requires a large space.

Subsequently, the main conveyor 15 moves a carriage 16 (carrying four seats 18) along the assembling path P and from the welding station S6 to the removal station S7 (arranged downstream of the welding station S6 and not illustrated in FIG. 4), where the carriage 16 stops and in which, for each component 1, the excess parts of the two opposite ends of the helical antenna 11 (cut in the previous welding station S6) are removed.

Subsequently, the main conveyor 15 moves a carriage 16 (carrying four seats 18) along the assembling path P and from the removal station S7 to the coating station S8 (arranged downstream of the removal station S7, optional and not illustrated in FIG. 4), where the carriage 16 stops and in which, for each component 1, the electrical contacts 12 on which the two opposite ends of the helical antenna 11 have been welded in the previous welding station S6 are coated with a protective and electrically insulating enamel. As previously mentioned, the coating station S8 is optional, since the presence of the protective and electrically insulating enamel is not strictly essential.

Subsequently, the main conveyor 15 moves a carriage 16 (carrying four seats 18) along the assembling path P and from the coating station S8 to the output station S2 (arranged downstream of the coating station S8), where the carriage 16 stops and in which the components 1 carried by the carriage 1 are extracted from the seats 18 to leave the main conveyor 15.

Figure 10:
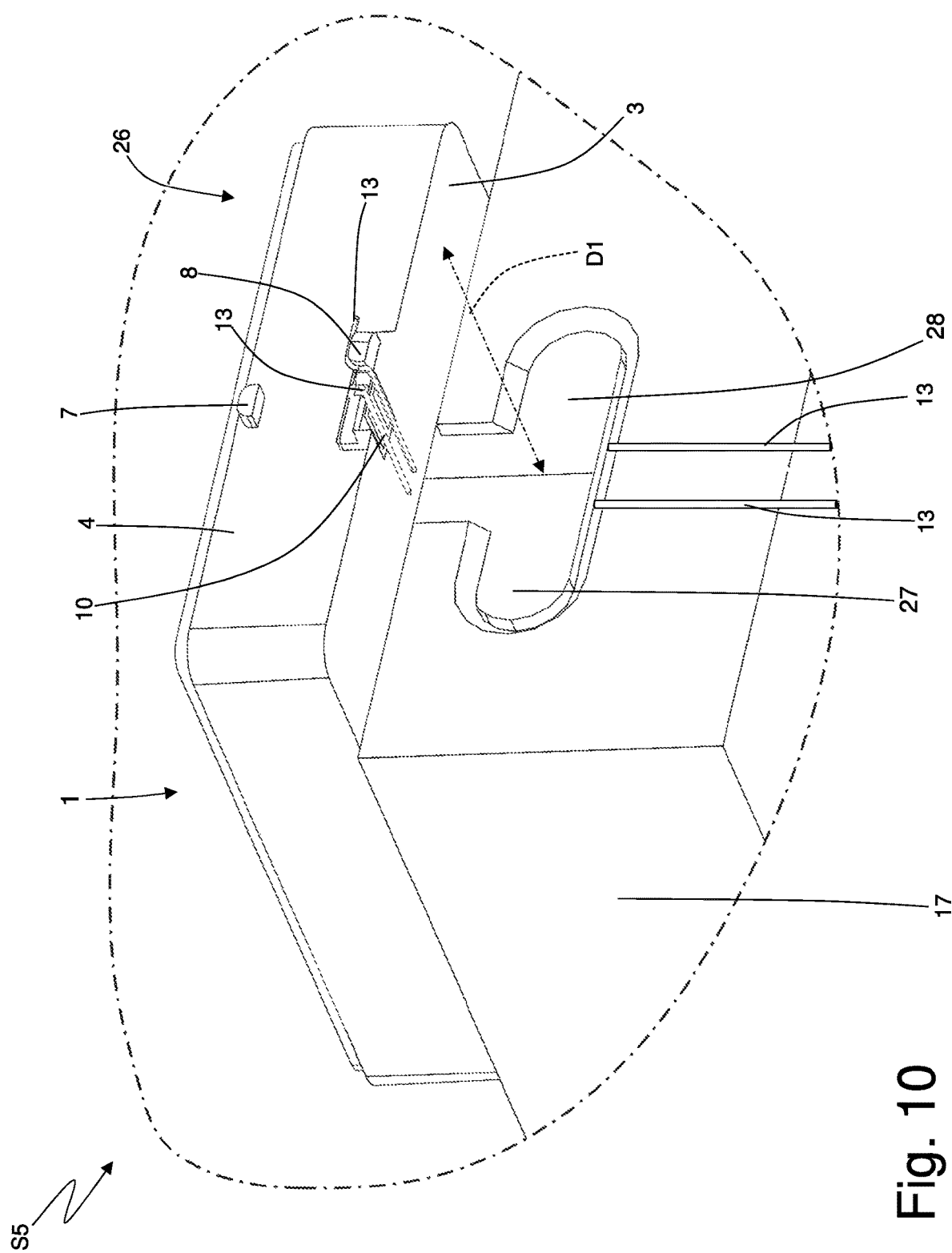

According to a preferred embodiment, each seat 18 of a carriage 16 houses the component 1 in a projecting manner, so that the component 1 partially protrudes out of the carriage 16 (namely, from the support plate 17 of the carriage 16) leaving a part of the lower wall 3 of the component 1 free (where the integrated circuit 10 with the two electrical contacts 12 is to be placed) as illustrated for example in FIG. 10.

In the application station S3, the adhesive means is coupled, from bottom to top, to the free part of the lower wall 3 of the component 1; if necessary, in the application station S3 a contrast body 24 is arranged (illustrated in FIG. 4) which is vertically movable and presses (slightly) from top to bottom on the components 1 carried by a carriage 16 to counteract the thrust from bottom to top, which is applied to the components 1 during the application of the adhesive means. In the feeding station S4, each integrated circuit 10 is coupled, from bottom to top, to the free part of the lower wall 3 of the component 1; preferably, a contrast body 25 (illustrated in FIG. 4) is arranged in the feeding station S4, which is vertically movable and presses (slightly) from top to bottom on the components 1 carried by a carriage 16 to counteract the thrust from bottom to top which is applied to the components 1 during the feeding of the integrated circuits 10.

As illustrated in FIGS. 6-10, each carriage 16 comprises for each seat 18 two clamps 27 and 28 (better illustrated in FIG. 10) which are mounted under the seat 18 in the area of the support plate 17 and are arranged side by side. Each clamp 27 or 28 is designed to grip and lock a corresponding end of the wire 13 which is wound around the respective component 1 and is provided with a single movable jaw that moves back and forth along a horizontal gripping direction D1 and perpendicular to the assembling path P. In other words, each clamp 27 or 28 opens and closes by means of a movement which develops along the gripping direction D1 and is therefore perpendicular to the assembling path P so that by closing the clamps 27 and 28 bring the wire 13 into contact with the corresponding electrical contacts 12 of the integrated circuit 10. In particular, in use the clamp 27 is used to grip an initial end of the wire 13 at the beginning of the winding of the wire 13 around the component 1 (that is, before winding the wire 13 around the component 1 its initial end is gripped by the clamp 27); on the other hand, in use the clamp 28 is used to grip a final end of the wire 13 at the end of the winding of the wire 13 around the component 1 (that is, after having completed the winding of the wire 13 around the component 1 its final end is gripped by the clamp 28).

The movable jaw of each clamp 27 or 28 is moved along the gripping direction D1 by means of a control rod 29 which is arranged across the support plate 17 and protrudes out of the rear portion of the support plate 17 to be pushed by an actuator device 30 which is in a fixed position (namely, mounted on the frame of the machine 14) in the area of the winding station S5. Preferably, each clamp 27 or 28 is normally closed, or in the absence of the intervention of the actuator device 30 it naturally remains closed; this result is obtained due to the presence of a spring, which tends to push the movable jaw of each clamp 27 or 28 towards the closed position and is compressed by the action of the actuator device 30 (namely, the actuator device 30 must overcome the elastic force generated by the spring to move the movable jaw of each clamp 27 or 28 towards the open position).

As previously mentioned, the winding station S5 is configured to operate with two carriages 16 at a time (namely, with eight components 1 at a time), therefore in the winding station S5 eight antennas 11 are made simultaneously by winding eight wires 13 around eight components 1. The winding station S5 comprises eight different twin stations 26, each assigned to a corresponding component 1 carried by a seat 18 and allows the respective wire 13 to be wound around the component 1; consequently, the winding station S5 operates in parallel by executing eight different windings at a time. According to other embodiments not illustrated, the number of stations 26 present in the winding station S5 is different (generally from a minimum of one to a maximum of twelve-sixteen).

In each station 26 two clamps 31 and 32 are provided, which are mounted (on the frame of the machine 14 and therefore outside the main conveyor 15 so as not to move together with the carriages 16) under the support plates 17 of the carriages 16 and are arranged side by side; in particular, the pair of clamps 31 and 32 are vertically aligned with a corresponding pair of clamps 27 and 28 carried by a carriage 16 that stops in the winding station S5.

Each clamp 31 or 32 is designed to grip and lock a corresponding end of the wire 13, which is wound around the respective component 1 and is provided with a single movable jaw that moves back and forth along a horizontal gripping direction D2 parallel to the assembling path P (namely, perpendicular to the gripping direction D1). In other words, each clamp 31 or 32 opens and closes by means of a movement that develops along the gripping direction D2 and is therefore parallel to the assembling path P. According to a preferred embodiment illustrated in the attached figures, the clamps 31 and 32 share a common motionless jaw arranged between the clamps 31 and 32.

In particular, in use the clamp 31 is used to grip the initial end of the wire 13 at the beginning of the winding of the wire 13 around the component 1 and (immediately) before the initial end of the wire 13 is gripped by the overlying clamp 27; instead, in use the clamp 32 is used to grip the final end of the wire 13 at the end of the winding of the wire 13 around the component 1 and (immediately) after the final end of the wire 13 is gripped by the overlying clamp 28.

Preferably, each clamp 31 or 32 is normally closed, or in the absence of the intervention of an actuator device it naturally remains closed; this result is obtained due to the presence of a spring which tends to push the movable jaw of each clamp 31 or 32 towards the closed position and is compressed by the action of the actuator device (namely, the actuator device must overcome the elastic force generated by the spring to move the movable jaw of each clamp 31 or 32 towards the open position).

Each station 26 of the winding station S5 comprises a blade 33 that is mounted (on the frame of the machine 14 and therefore outside the main conveyor 15 so as not to move together with the carriages 16) under the support plates 17 of the carriages 16 in order to be, in use, between a respective clamp 28 carried by a carriage 16 and a respective clamp 32. Each blade 33 is, in use, movable along a cutting direction coinciding with the gripping direction D2, namely, each blade 33 moves back and forth by means of a movement parallel to the assembling path P. Thanks to its position, each movable blade can cut a final end of a wire 13 which is locked in a higher position by a respective clamp 28 carried by a carriage 16 and is locked in a lower position by a respective clamp 32.

Each station 26 of the winding station S5 comprises a movable finger 34 which is used to bring the wire 13 close to the component 1, to wind the wire 13 around the component 1, and then to move the wire 13 away from the component 1. Each movable finger 34 has a tubular shape having a central hole, which passes through the movable finger 34 from side to side and inside which the wire 13 is arranged; namely, the wire 13 enters from a rear opening of the movable finger 34 and exits from a front opening of the movable finger 34. For each movable finger 34, the wire 13 is progressively unwound by a reel contained in a special container 35 (illustrated in FIG. 4), passes through a tensioning device 36 (illustrated in FIG. 4) provided with at least one movable dancing roller actuated by a spring and then reaches the movable finger 34; each tensioning device 36 is configured to apply an always constant tension to the respective wire 13.

The winding station S5 comprises a common support body 37 (illustrated in FIG. 4) on which all eight movable fingers 34 are mounted to always move all eight movable fingers 34 together and with the same identical law of motion; in particular, the eight movable fingers 34 are rigidly mounted on the support body 37, namely, the eight movable fingers 34 always move integral with the support body 37 and never perform any type of movement relative to the support body 37. The support body 37 is moved by a single actuator device 38 (schematically illustrated in FIG. 4) provided with (at least) its own independent electric motor. In use, each movable finger 34 is arranged with a horizontal orientation when the wire 13 must be moved vertically in order to rise as it approaches the component 1 or in order to lower while moving away from the component 1; moreover, in use, each movable finger 34 is arranged with a vertical orientation when the wire 13 has to be horizontally moved in order be wound around the component 1.

Each station 26 of the winding station S5 comprises a containment body 39 which, in use, is placed against the pin 7 so as to extend the pin 7 when the wire 13 must be bent around the pin 7 so as to prevent the wire 13 from accidentally escaping from the pin 7; namely, a little before the wire 13 is bent by 90° around the pin 7, the containment body 39 is placed against the pin 7 to extend the pin 7 and thus prevent the wire 13 from accidentally escaping from the pin 7. In this regard, it is important to note that the small pin 7 cannot have an excessive extension (due to problems of space independent of the machine 14) and, at the same time, the mobile finger 34, while moving, cannot pass too close to the component 1 to prevent that small positioning errors (combined with the constructive tolerances of the component 1) can cause accidental impacts of the movable finger 34 against the component 1.

Each station 26 of the winding station S5 comprises a containment body 40 which, in use, is placed against the pin 8 so as to extend the pin 8 when the wire 13 must be bent around the pin 8 so as to prevent the wire 13 from accidentally escape from the pin 8; namely, a little before the wire 13 is bent by 90° around the pin 8, the containment body 40 is placed against the pin 8 to extend the pin 8 and thus prevent the wire 13 from accidentally escaping from the pin 8. In this regard, it is important to note that the small pin 8 cannot have an excessive extension (due to problems of space independent of the machine 14) and, at the same time, the movable finger 34, while moving, cannot pass too close to the component 1 to prevent that small positioning errors (combined with the constructive tolerances of the component 1) can cause accidental impacts of the movable finger 34 against the component 1.

According to a different embodiment not illustrated, each station 26 of the winding station S5 also comprises a locking body, which is arranged alongside the containment body 40 and is used, in use, to lock the wire 13 against the component 1 at the end of the winding of the wire 13 around the component 1 and before the final end of the wire 13 is locked by the corresponding clamp 28 (and immediately afterwards by the corresponding clamp 32); due to the action of the locking body it is avoided that the winding of the wire 13 around the component 1 can lose tension before the final end of the wire 13 is locked by the corresponding clamp 28 (and immediately after by the corresponding clamp 32).

According to a preferred embodiment illustrated in the attached figures, each station 26 comprises a further movable finger 41 that is arranged under the two clamps 31 and 32 and between the two clamps 31 and 32 (namely, under the common jaw without movement arranged between the clamp 31 and 32) and is moved vertically so as to remove the initial end of the wire 13 that can remain inside the clamp 32 even when the clamp 32 is opened (the initial end of the wire 13 is very light and therefore, often does not naturally descend by gravity out of the clamp 32); in this way, or thanks to the unwiring action exerted by the movable finger 41, it is avoided that the initial end of the wire 13 remains undesirably inside the clamp 32 and therefore breaks by tearing when the carriage 16 moves at the end of the winding. In particular, the clamp 32 is opened after the initial end of the wire 13 has been engaged by the clamp 31 to start a new winding process and, at this point, the movable finger 41 performs a vertical working stroke downwards so as to remove the end start of the wire 13 from the clamp 32.

The winding of a wire 13 around a component 1 in a single station 26 of the winding station S5 is described in the following; obviously, what happens in a single station 26 of the winding station S5 takes place simultaneously and in exactly the same way also in the other stations 26 of the winding station S5.

Initially, the station 26 is empty (namely, is devoid of the component 1 carried by a carriage 16), an initial end of the wire 13 is locked in the clamp 32, and the movable finger 34 (arranged horizontally) is arranged under the clamp 32. The initial end of the wire 13 locked in the clamp 32 is the initial end if referred to the new winding, which will be made around the next component 1 that will arrive in the station 26 and was instead the final end of the wire 13 if referred to the previous winding that has been completed around the previous component 1, which was previously in the station 26. When the machine 14 is started after a replacement of the coils from which the wire 13 is unwound, an operator manually places the initial end of the wire 13 in the clamp 32.

Subsequently, the carriage 16 carries the component 1 to the station 26, the clamps 27 and 31 open, the movable finger 34 (still arranged horizontally) moves vertically from bottom to top in order to pass the initial end of the wire 13 first through the clamp 31 and subsequently through the clamp 27, and finally the clamps 31 and 27 close to lock (in two different points) the initial end of the wire 13; preferably, first only the clamp 31 closes while the clamp 27 is still open and subsequently the clamp 27 also closes. It is important to note that the clamp 27 opens and closes by means of a movement along the gripping direction D1 which is perpendicular to the assembling path P and therefore in the closing movement the clamp 27 moves the wire 13 perpendicular to the assembling path P by pulling the wire 13 under the component 1 (namely, near the lower wall 3 of the component 1 so that the wire rests on a corresponding electrical contact 12 of the integrated circuit 10 as illustrated in FIG. 10). In this regard, it is important to note that the component 1 arranged in the seat 18 obtained in the support plate 17 projects out of the support plate 17, leaving free a portion (in which the integrated circuit 10 is arranged) of the lower wall 3 of the component. 1.

Subsequently, the movable finger 34 rotates by 90° to move from a horizontal to a vertical orientation and begin to rotate around the component 1 to wind the wire 13 around the component 1. Before starting to wind the wire 13 around the component 1, the wire 13, which rises vertically towards the component 1, is bent by the movable finger 34 around the pin 7 that horizontally projects from the component 1 to cause the wire 13 to make a 90° turn, which deflects the wire 13 towards a horizontal orientation. In particular, the 90° rotation of the movable finger 34, which moves from a horizontal to a vertical orientation, occurs at the same time as the wire 13 is bent around the pin 7. As previously mentioned, in this step the containment body 39 rests against the pin 7 so as to extend the pin 7 when the wire 13 must be bent around the pin 7 so as to prevent the wire 13 from accidentally escaping from the pin 7.

Subsequently, the movable finger 34 makes a series of turns around the component 1 to form, with the wire 13, a series of (vertically offset) turns around the walls 4, 5 and 6 of the component 1.

More or less when the winding of the wire 12 around the component 1 is started, the clamp 32 opens and the movable finger 41 performs a vertical working stroke downwards so as to remove the initial end of the wire 13 from the clamp 32.

When the end of the winding of the wire 13 around the component 1 approaches (namely, before completing the last turn of the winding), the containment body 39 is moved away from the component 1 and (preferably) the clamp 31 is opened to free the initial end of the wire 13 (on the other hand the clamp 27 remains well closed).

After finishing the winding of the wire 13 around the component 1, the movable finger 34 bends the wire 13 arranged horizontally around the pin 8 to cause the wire 13 to make a 90° turn, which deflects the wire 13 towards a vertical orientation. Simultaneously with the bending of the wire 13 around the pin 8, the movable finger 34 rotates by 90° to move from a vertical orientation to a horizontal orientation. As previously stated, in this step the containment body 40 rests against the pin 8 so as to extend the pin 8 when the wire 13 must be bent around the pin 8 in order to prevent the wire 13 from accidentally escaping from the pin 8.

When the end of the winding of the wire 13 around the component 1 approaches (namely, before completing the last turn of the winding), the clamp 28 is opened. The movable finger 34, by moving the wire 13 vertically from top to bottom after bending the wire 13 around the pin 8, makes the final end of the wire 13 pass through the open clamp 28 which immediately closes, locking the final end of the wire 13; subsequently, the movable finger 34 moving the wire 13 vertically from top to bottom, after bending the wire 13 around the pin 8, makes the final end of the wire 13 pass also through the open clamp 32 which immediately closes thus locking the final end of the wire 13. It is important to observe that the clamp 28 opens and closes by means of a movement along the gripping direction D1 which is perpendicular to the assembling path P and therefore in the closing movement the clamp 28 moves the wire 13 perpendicular to the assembling path P by pulling the wire 13 under the component 1 (namely, near the lower wall 3 of the component 1 so that the wire rests on a corresponding electrical contact 12 of the integrated circuit 10 as illustrated in FIG. 10). In this regard, it is important to note that the component 1, which is arranged in the seat 18 obtained in the support plate 17 projects out of the support plate 17 leaving free a portion (in which the integrated circuit 10 is arranged) of the lower wall 3 of the component. 1.

Subsequently, the containment body 40 moves away from the component 1 and the winding ends with the movement of the movable blade 33 which, by moving parallel to the assembling path P, cuts the final end of the wire 13 after the final end of the wire 13 has been locked both by the clamp 28 and by the clamp 32 (namely, the movable blade 33 cuts the final end of the wire 13 between the portion locked in a higher position by the clamp 28 and the portion locked in a lower position by the clamp 32).

According to a possible embodiment, the winding of the wire 13 around the component 1 is carried out from bottom to top, therefore, before starting to wind the wire 13, the wire 13 that rises vertically towards the component 1 is bent around the pin 8 (arranged in a lower position) to cause the wire 13 to make a 90° turn, which deflects the wire 13 towards a horizontal orientation; furthermore, after finishing the winding of the wire 13, the wire 13 arranged horizontally, is bent around the pin 7 (arranged in a higher position) to cause the wire 13 to make a 90° turn, which deflects the wire 13 towards a vertical orientation. According to a different embodiment, the winding of the wire 13 around the component 1 is carried out from top to bottom, therefore, before starting to wind the wire 13, the wire 13 that rises vertically towards the component 1 is bent around the pin 7 (arranged in a higher position) to cause the wire 13 to make a 90° turn, which deflects the wire 13 towards a horizontal orientation; furthermore, after having finished winding the wire 13, the wire 13 arranged horizontally is bent around the pin 8 (arranged in a lower position) to cause the wire 13 to make a 90° turn, which deflects the wire 13 towards a vertical orientation. In this embodiment, the winding of the wire 13 around the component 1 takes place over a vertical section of the wire 13 which reaches the pin 7 (arranged in a higher position) and therefore helps to lock the initial end of the wire 13 against the component 1 thus ensuring greater winding stability.

Figure 11:
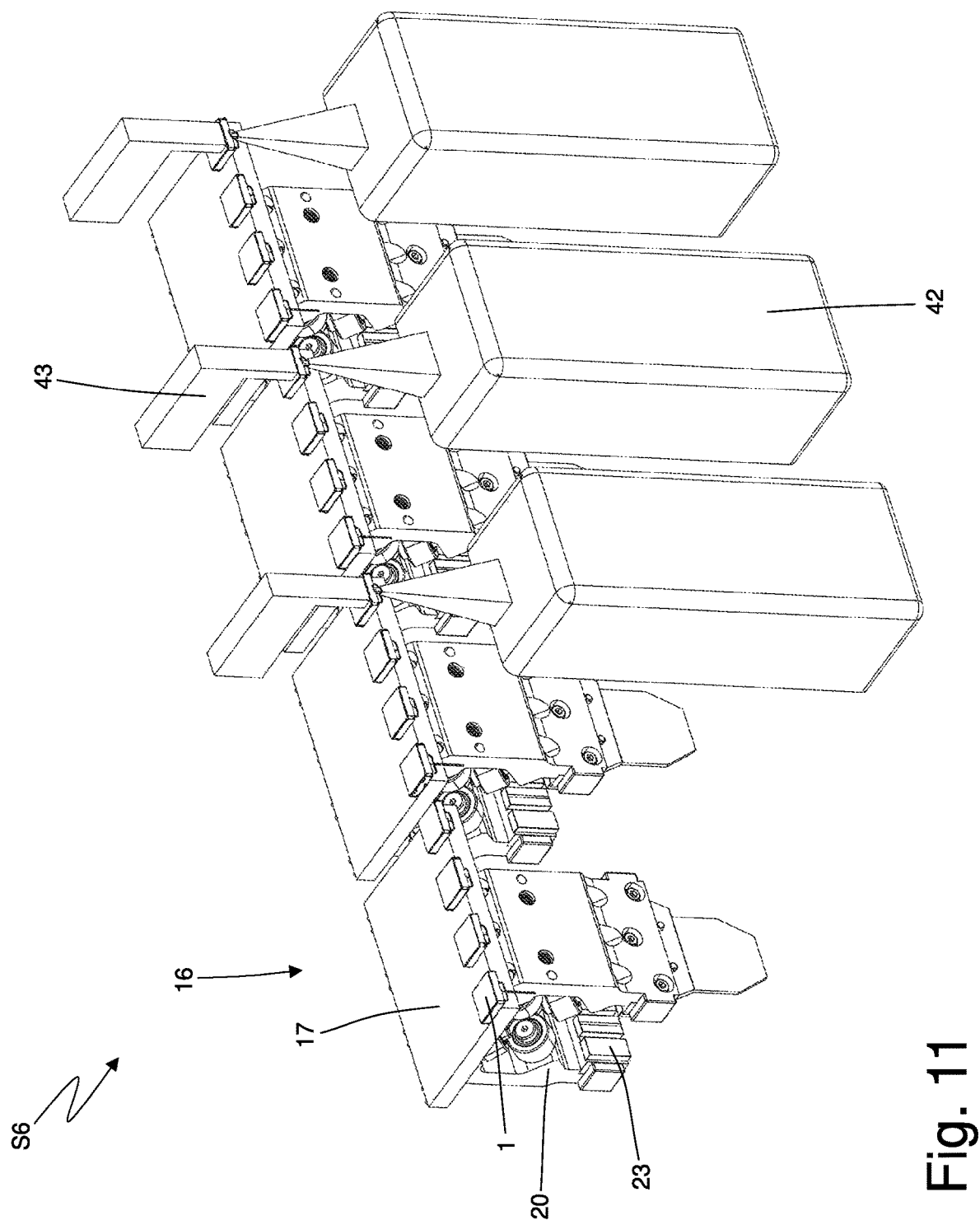
FIG. 11 is a perspective view and with the removal of parts for clarity of a welding station of the machine of FIG. 3.

As illustrate in FIG. 11, the welding station S6 comprises four welding heads 42, each arranged in a fixed position and configured to weld the two opposite ends of the helical antenna 11 against the two electrical contacts 12 of the integrated circuit 10; in use, the main conveyor 15 moves a carriage 16 to bring in succession all four components 1 carried by the carriage 16 to a corresponding welding head 42. As previously mentioned, each seat 18 of a carriage 16 houses the component 1 in a projecting manner, 1 so that the component 1 partially protrudes out of the carriage 16 leaving free a part of the lower wall 3 of the component 1 (where the integrated circuit 10 with the two electrical contacts 12 is arranged); moreover, the two electrical contacts 12 of the integrated circuit 10 of each component 1 carried by a carriage 16 are facing downwards. Consequently, each welding head 42 is initially arranged under the carriage 16 and cyclically moves upwards (when the carriage 16 is stationary) to push the two opposite ends of the helical antenna 11 against the two electrical contacts 12 of the integrated circuit 10 and then perform the welding. That is, each welding head 42 is provided with two side-by-side welding elements and is made to rise from bottom to top in order to push the two opposite ends of the helical antenna 11 against the two electrical contacts 12 of the integrated circuit 10 and thus carry out the welding.

Preferably, in the welding station S6 a contrast body 43 is coupled to each welding head 42, which is vertically movable and presses (slightly) from top to bottom on the component 1 carried by a carriage 16 to counteract the thrust from bottom to top that is applied to the component 1 during the welding process.

Preferably, each welding head 42 is also configured to make a cut of the two opposite ends of the helical antenna 11 downstream of the welds with the two electrical contacts 12 of the integrated circuit 10 so as to separate the excess part of the two opposite ends of the helical antenna 11.

In the welding station S6 and during the welding, the main conveyor 15 slightly moves each carriage 16 so as to align each seat 18 of the carriage 16 in succession with a corresponding welding head 42.

Figure 12:
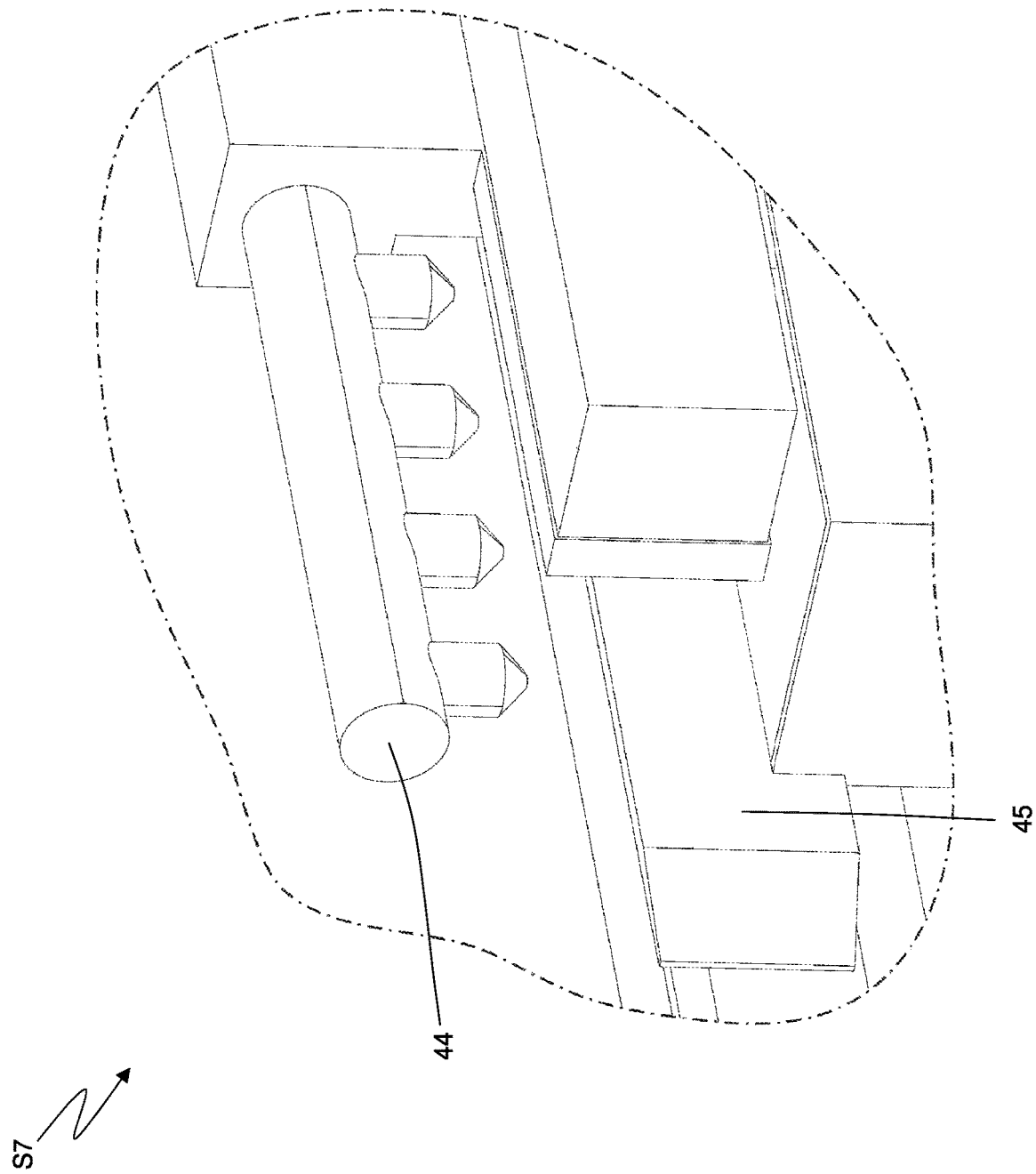
FIG. 12 is a perspective view and with the removal of parts for clarity of a removal station of the machine of FIG. 3.

As illustrated in FIG. 12, the removal station S7 comprises four blowing nozzles 44, which are connected to a common distributor of compressed air and are oriented downwards so that each blowing nozzle 44 can, in use, generate a gust of compressed air that is directed from top to bottom and strikes the front wall 4 of a corresponding component 1 carried by a carriage 16 stationary in the removal station S7. The gust of compressed air emitted by each blowing nozzle 44 strikes, from top to bottom, the front wall 4 of a corresponding component 1 carried by a carriage 16 stationary in the welding station S6 and therefore pushes the excess parts of the two opposite ends of the helical antenna 11 (cut in the previous welding station S6) downwards: preferably, the excess parts of the two opposite ends of the helical antenna 11 pushed downwards by a gust of compressed air are collected in a container 45, which is arranged under the carriage 16.

Figure 13:
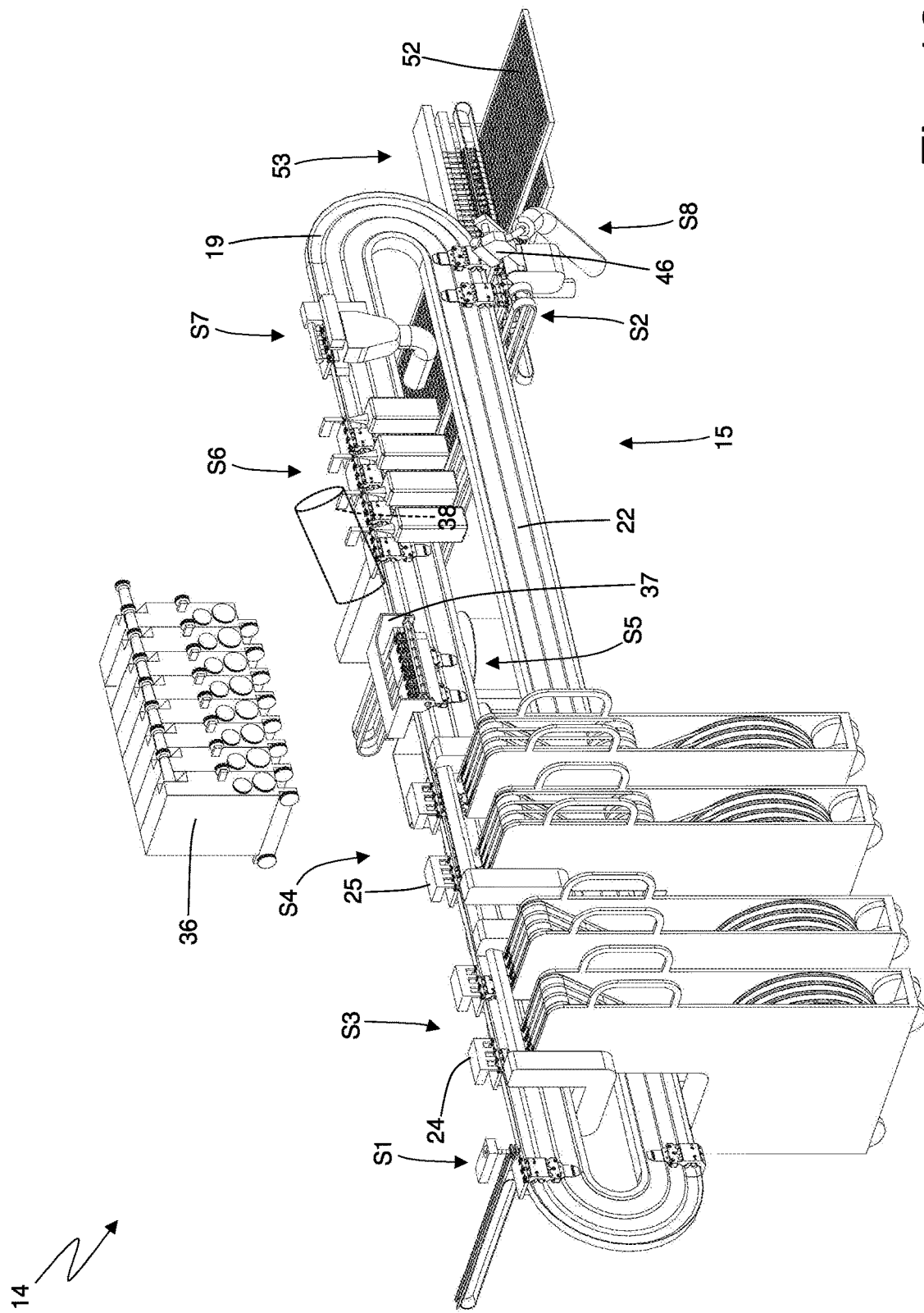
FIGS. 13 and 14 are two different perspective views of the machine of FIG. 3 with a greater number of elements provided.
Figure 14:
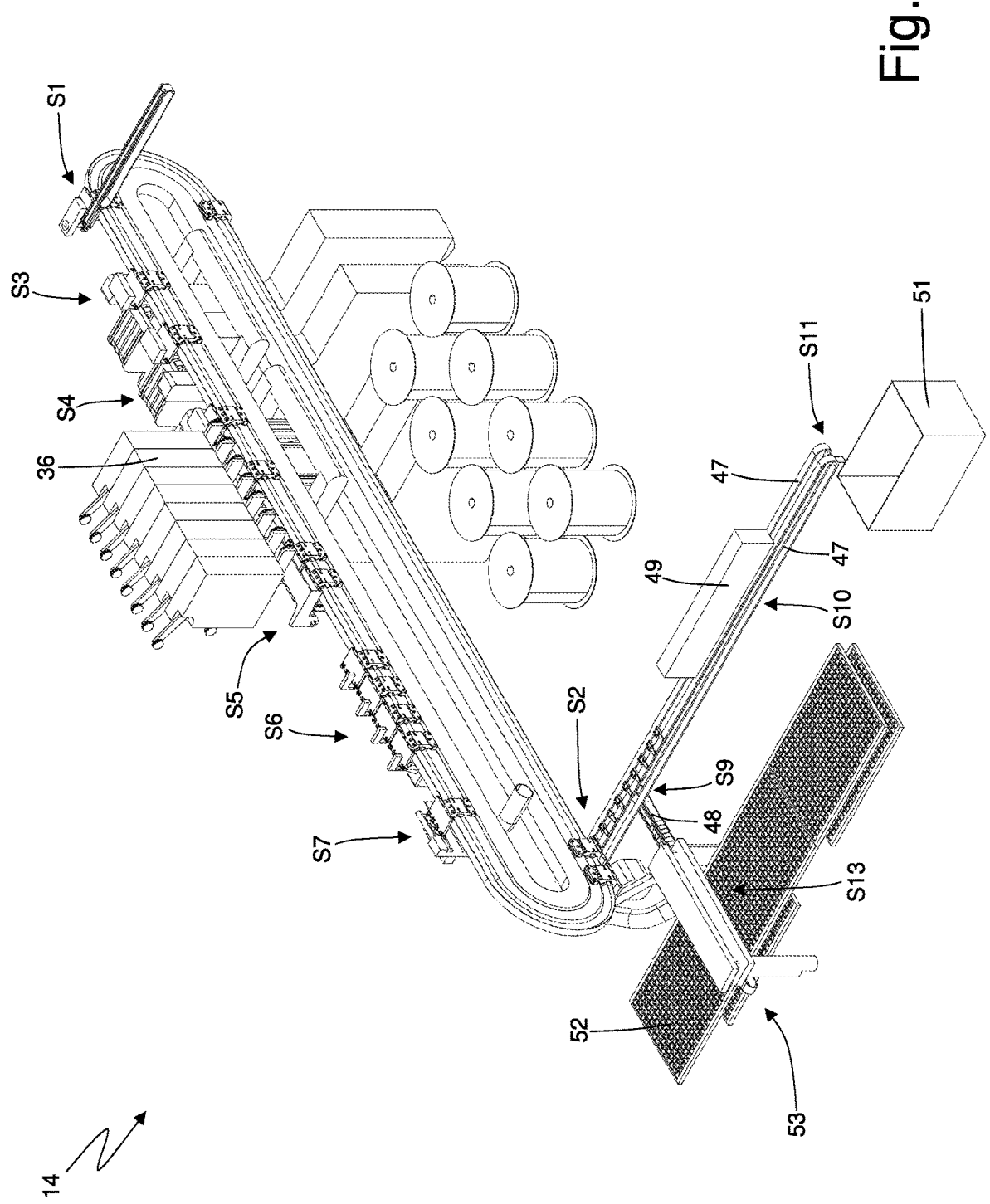

As illustrated in FIG. 13, the coating station S8 comprises (at least) a sprayer device 46 which in use is operated to spray a layer of protective and electrically insulating enamel on the electrical contacts 12 of a corresponding component 1 carried by a carriage 16 stationary in the coating station S8 (in the coating station S8 the carriages 16 have overturned and therefore the electrical contacts 12 are facing upwards).

Figure 15:
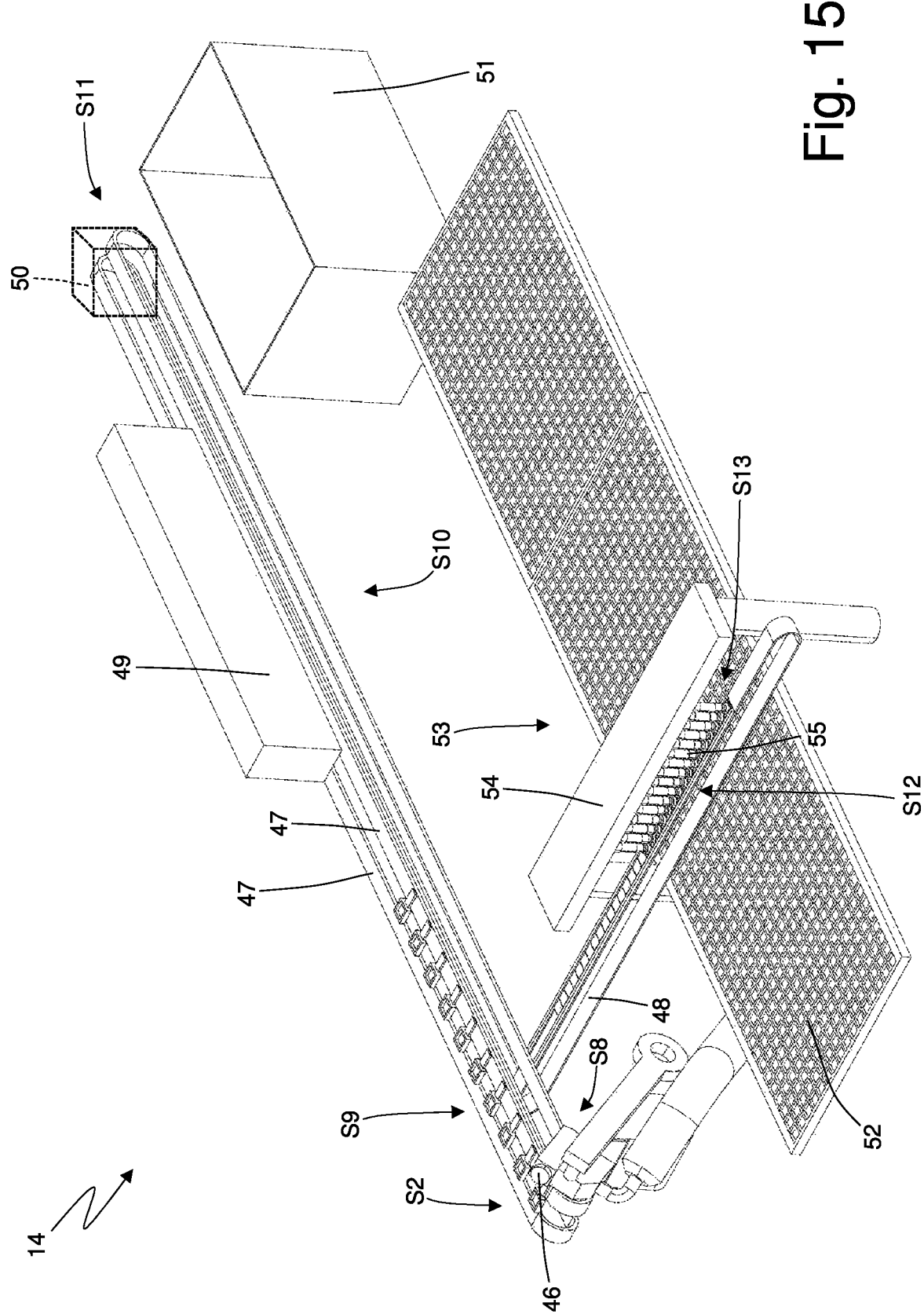
FIGS. 15 and 16 are two different perspective views and with the removal of parts for clarity of a final part of the machine of FIG. 3.
Figure 16:
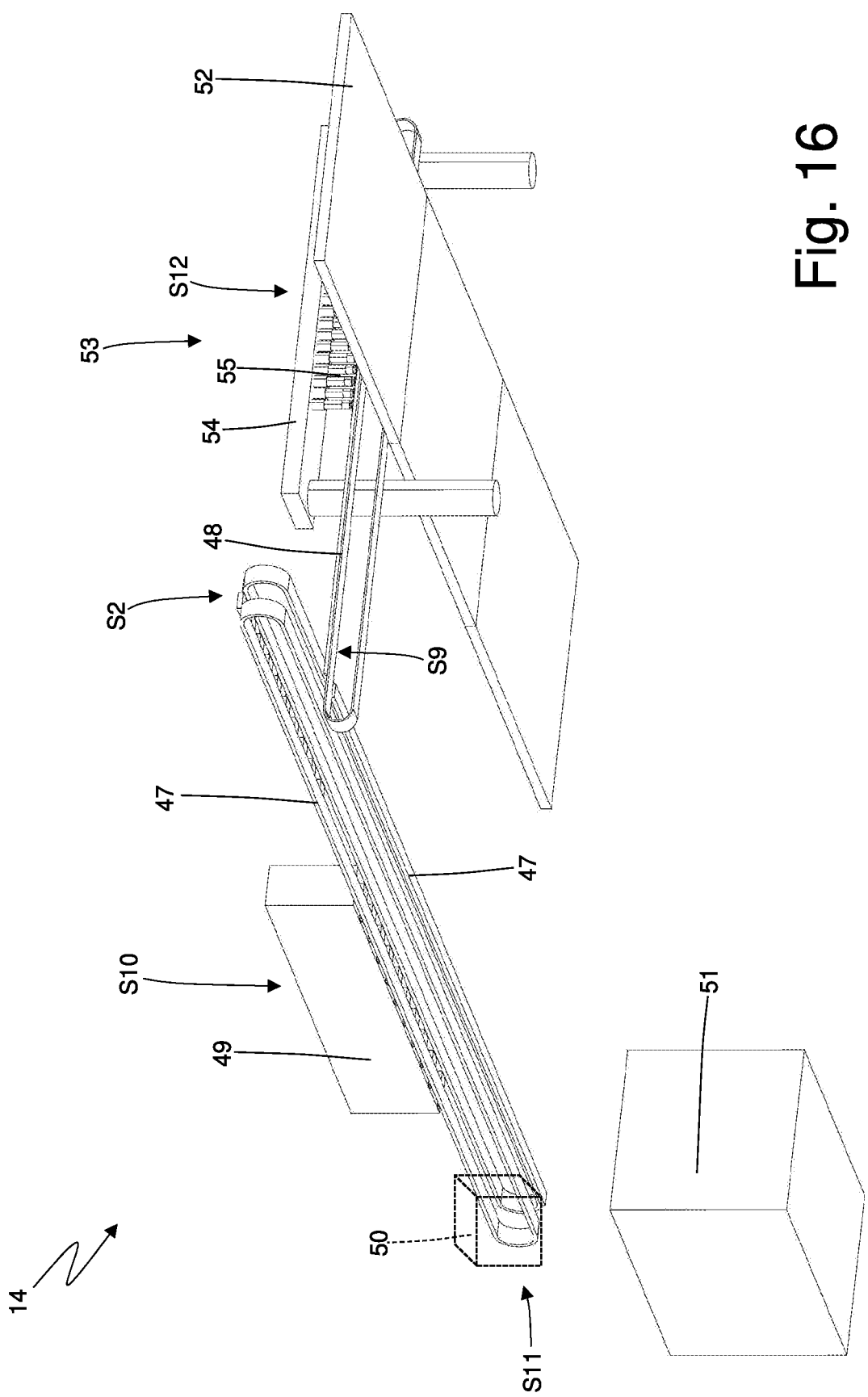

As illustrated in FIGS. 15 and 16, the machine 14 comprises two twin and parallel control conveyors 47 which intersect the main conveyor 14 at the output station S2, receive the components 1 from the carriages 16 of the main conveyor 14, and move the components 1 along two twin paths; namely, half of the components 1 coming from the carriages 16 of the main conveyor 14 move along one of the two control conveyors 47 while the remaining half of the components 1 coming from the carriages 16 of the main conveyor 14 move along the other of the two control conveyors 47. The two control conveyors 47 receive the components 1 from the carriages 16 of the main conveyor 14 in the output station S2 and transfer the components 1 to a single transfer conveyor 48 in a transfer station S9.

In the embodiment illustrated in the attached figures, the two control conveyors 47 are parallel to one another and move both components 1 along a control path which is horizontal and perpendicular to the assembling path P; whereas, the single transfer conveyor 48 moves the components 1 along a transfer path which is horizontal and perpendicular to the control path (hence parallel to the assembling path P).

In the embodiment illustrated in the attached figures, the conveyors 47 and 48 are belt conveyor and each comprise a belt wound in a loop around two end pulleys (at least one of which is motorized). Furthermore, in the embodiment illustrated in the attached figures, the conveyors 47 and 48 move with an intermittent law of motion which cyclically alternates movement steps and stopping steps.

The control path first passes through a control station S10 where a control unit 49 is arranged to check the correct operation of the transponders 9 coupled to the components 1 and then passes through a discard station S11 before arriving at the transfer station S9. The control unit 49 can be vertically movable to approach the components 1 carried by the two control conveyors 47 when it must verify the correct operation of the transponders 9 coupled to the components 1 and subsequently to move away from the components 1 at the end of the verification. The verification of the correct functioning of each transponder 9 obviously takes place without the need for any physical contact as the transponder 9 can, by definition, be interrogated without contact and has the function of identifying any defective transponders 9 which must be identified, traced and finally discarded (in the discard station S11). The greatest difficulty in the control operations carried out by the control unit 49 is to discriminate the response of a specific transponder from the responses of the adjacent transponders 9.

The discard station S11 comprises an ejection device 50 which pushes any defective components 1 (namely, components 1 coupled to a defective transponder 9) out of the corresponding control conveyors 47 to cause the defective components 1 to fall by gravity into an underlying container 51.

In the transfer of the components 1 from the two control conveyors 47 to the transfer conveyor 48, any "holes" caused by the discarding of defective components 1 in the discard station S11 are filled so that, in the transfer conveyor 48, a continuous row (namely, without interruptions) of components 1 is provided.

The transfer path defined by the transfer conveyor 48 begins at the transfer station S9 and ends at a pickup station S12.

The machine 14 comprises an output conveyor which moves a succession of trays 52 along a horizontal output path and perpendicular to the transfer path (therefore parallel to the control path); each tray 52 has a succession of rows of seats each designed to house a corresponding component 1. The machine 14 further comprises a transfer device 53 which picks up a row of components 1 from the transfer conveyor 48 in the pickup station S12 and transfers the row of components 1 to as many seats of a tray 52 in a release station S13. The transfer device 53 comprises a beam 54 which is movable vertically and horizontally and supports a row of sucking gripping heads 55 each designed to grip a corresponding component 1. The beam 54 moves cyclically between the pickup station S12, in the area of the transfer conveyor 48, and the release station S13, in the area of the tray 52.

According to a different embodiment not illustrated, the control unit 49 is not arranged above the control conveyors 47 but is arranged next to the control conveyors 47 and in the area of the control station S10 a movable plate provided with a plurality of seats designed to receive the components 1 is provided. A first transfer device transfers a group of components 1 from the control conveyors 47 to the seats of the movable plate, the movable plate moves to couple with the control unit 49, and at the end of the control the movable plate approaches the control conveyors 47 and a second transfer device transfers again the group of components 1 from the seats of the movable plate to the control conveyors 47.

In the non-limiting embodiment described above, the component 1 is part of a disposable cartridge of an electronic cigarette, but the assembling method described above can be applied to the production of components provided with a transponder for articles of any type (namely, any product category). For example, the assembling method described above can be applied to the production of components provided with a transponder for a machine, a system, a structure, for example, but not only, in the tobacco, pharmaceutical, food or entertainment fields; more generally, the assembling method described above can be applied to the production of components provided with a transponder for applications of any type.

The embodiments described herein can be combined with one another without departing from the scope of the present invention.

The assembling method described above has numerous advantages.

First, the assembling method described above allows to operate at a high operating speed (measured as the number of components produced in a time frame).

Furthermore, the assembling method described above allows to quality (generally measured as a maintain a high production percentage of defective pieces).

Finally, the assembling method described above is relatively simple and inexpensive to implement.

LIST OF REFERENCE NUMBERS OF THE FIGURES 1 component
2 upper wall
3 lower wall
4 front wall
5 rear wall
6 side walls
7 pin
8 pin
9 transponders
10 integrated circuit
11 antenna
12 electrical contacts
13 wire
14 machine
15 main conveyor
16 carriages
17 support plate
18 seats
19 annular guide
20 slides
21 linear electric motor
22 annular stator
23 movable sliders
24 contrast body
25 contrast body
26 stations
27 clamp
28 clamp
29 control rod
30 actuator device
31 clamp
32 clamp
33 blade
34 movable finger
35 container
36 tensioning device
37 support body
38 actuator device
39 containment body
40 containment body
41 movable finger
42 welding head
43 contrast body
44 blowing nozzles
45 container
46 sprayer device
47 control conveyors
48 transfer conveyor
49 control units
50 ejection device
51 container
52 tray
53 transfer device
54 beam
55 gripping head
P assembling path
S1 input station
S2 output station S3 application station
S4 feeding station
S5 winding station
S6 welding station
S7 removal station
S8 coating station
S9 transfer station
S10 control station
S11 discard station
S12 pickup station
S13 release station
D1 gripping direction
D2 gripping direction

The invention claimed is:

1. A method to assemble a transponder (9) provided with a helical antenna (11) in a component (1) of an article; the method comprises the steps of:
   moving, by means of a main conveyor (15) and along an assembling path (P), a carriage (16) carrying at least one seat (18) designed to house the component (1);
   placing, in an input station (S1) arranged along the assembling path (P), the component (1) in the seat (18) of the carriage (16);
   coupling, in a feeding station (S4) arranged along the assembling path (P) downstream of the input station (S1), an integrated circuit (10) provided with two electrical contacts (12) to the component (1);
   winding, in a winding station (S5) arranged along the assembling path (P) downstream of the feeding station (S4), an externally insulated conductor wire (13) around the component (1) in order to obtain a series of turns making up the helical antenna (11); and
   welding, in a welding station (S6) arranged along the assembling path (P) downstream of the winding station (S5), two opposite ends of the helical antenna (11) to the two electrical contacts (12) of the integrated circuit (10).

2. The method according to claim 1, wherein winding the wire (13) comprises the steps of:
   locking an initial end of the wire (13) by means of a first clamp (27) before starting to wind the wire (13); and
   locking a final end of the wire (13) by means of a second clamp (28) at the end of the winding of the wire (13).

3. The method according to claim 2, wherein the first clamp (27) and the second clamp (28) are carried by a support plate (17) of the carriage (16), where the seat (18) is defined, are arranged under the seat (18).

4. The method according to claim 2, wherein the first clamp (27) and the second clamp (28) open and close by means of a movement that is perpendicular to the assembling path (P) so that by closing bring the wire (13) into contact with the corresponding electrical contacts (12) of the integrated circuit (10).

5. The method according to claim 2, wherein winding the wire (13) comprises the steps of:
   locking, before locking the initial end of the wire (13) by means of the first clamp (27), the initial end of the wire (13) also by means of a third clamp (31), which is arranged in a fixed position and externally to the main conveyor (15) in the area of the winding station (S5) and under the first clamp (27); and
   locking, after having locked the final end of the wire (13) by means of the second clamp (28), the final end of the wire (13) also by means of a fourth clamp (32), which is arranged next to the third clamp (31) in a fixed position and externally to the main conveyor (15) in the area of the winding station (S5) and under the second clamp (28).

6. The method according to claim 5, wherein the third clamp (31) and the fourth clamp (32) open and close by means of a movement that is parallel to the assembling path (P).

7. The method according to claim 6, wherein the third clamp (31) and the fourth clamp (32) share a common jaw without movement arranged between the third clamp (31) and the fourth clamp (32).

8. The method according to claim 5, wherein winding the wire (13) comprises the steps of:
   opening the fourth clamp (32) when the winding of the wire (13) around the component (1) has been started; and
   vertically moving downwards a movable finger (41) which is arranged below the third clamp (31) and the fourth clamp (32) to remove an initial end of the wire (13) from the open fourth clamp (32).

9. The method according to claim 5, wherein winding the wire (13) comprises the further step of cutting, by means of a movable blade arranged between the second clamp (28) and the fourth clamp (32), the final end of the wire (13) after the final end of the wire (13) has been locked both by the second clamp (28) and by the fourth clamp (32).

10. The method according to claim 9, wherein the movable blade moves back and forth by means of a movement that is parallel to the assembling path (P).

11. The method according to claim 1, wherein winding the wire (13) comprises the further step of moving the wire (13) by means of a movable finger (34), which engages the wire (13) in a sliding manner.

12. The method according to claim 11, wherein the movable finger (34) has a tubular shape having a central hole, which passes through the movable finger (34) from side to side and inside which the wire (13) is arranged.

13. The method according to claim 11, wherein winding the wire (13) comprises the steps of:
   placing the movable finger (34) with a horizontal orientation when the wire (13) has to be vertically moved in order to rise while getting close to the component (1) or in order to lower while moving away from the component (1); and
   placing the movable finger (34) with a vertical orientation when the wire (13) has to be horizontally moved in order be wound around the component (1).

14. The method according to claim 1, wherein winding the wire (13) comprises the steps of:
   bending, before starting to wind the wire (13), the wire (13) that vertically rises towards the component (1) around a first pin (7), which horizontally projects from the component (1), in order to cause the wire (13) to make a 90° turn, which deflects the wire (13) towards a horizontal orientation; and
   bending, after having ended winding the wire (13), the horizontally arranged wire (13) around a second pin (8), which horizontally projects from the component (1), in order to cause the wire (13) to make a 90° turn, which deflects the wire (13) towards a vertical orientation.

15. The method according to claim 14, wherein the first pin (7) is arranged in the area of an upper wall (2) of the component (1) and the second pin (8) is arranged in the area of a lower wall (3) of the component (1).

16. The method according to claim 14, wherein the first pin (7) is arranged in the area of a lower wall (3) of the component (1) and the second pin (8) is arranged in the area of an upper wall (2) of the component (1).

17. The method according to claim 14, wherein winding the wire (13) comprises the steps of:
    placing on the first pin (7) a first containment body (39) which extends the first pin (7) before bending the wire (13) around the first pin (7); and
    placing a second containment body (40) on the second pin (8) which extends the second pin (8) before bending the wire (13) around the second pin (8).

18. The method according to claim 1 and comprising the further step of applying, in an application station (S3) arranged between the input station (S1) and the feeding station (S4), an adhesive means on the component (1), said adhesive means being designed to cause the integrated circuit (10) to adhere to the component (1).

19. The method according to claim 1, wherein:
    the seat (18) houses the component (1) in a projecting manner so that the component (1) partially protrudes from the carriage (16) leaving part of a lower wall (3) of the component (1) free; and
    in the feeding station (S4), the integrated circuit (10) is coupled, from the bottom to the top, to the free part of the lower wall (3) of the component (1).

20. The method according to claim 19, wherein:
    the two electrical contacts (12) of the integrated circuit (10) face downwards; and
    in the welding station (S5), a welding head (42) provided with two welding elements side by side is caused to rise from the bottom to the top in order to push two opposite ends of the helical antenna (11) against the two electrical contacts (12) of the integrated circuit (10) and, hence, obtain the weld.

21. The method according to claim 1, wherein the main conveyor (15) comprises:
    an annular guide;
    a slide, which is coupled to the guide so as to freely slide along the guide and supports the carriage (16); and
    a linear electric motor, which moves the slide and is provided with an annular stator, which is arranged in a fixed position along the guide, and with a movable slider, which is electromagnetically coupled to the stator so as to receive, from the stator, a driving force and is rigidly connected to the slide.

22. A machine to assemble a transponder (9) provided with a helical antenna (11) in a component (1) of an article; the machine comprises:
    a main conveyor (15), which is designed to move, along an assembling path (P), a carriage (16) carrying at least one seat (18) designed to house the component (1);
    an input station (S1), which is arranged along the assembling path (P) and is configured to place the component (1) in the seat (18) of the carriage (16);
    a feeding station (S4), which is arranged along the assembling path (P) downstream of the input station (S1) and is configured to couple an integrated circuit (10) provided with two electrical contacts (12) to the component (1);
    a winding station (S5), which is arranged along the assembling path (P) downstream of the feeding station (S4) and is configured to wind an externally insulated conductor wire (13) around the component (1) in order to obtain a series of turns making up the helical antenna (11); and
    a welding station (S6), which is arranged along the assembling path (P) downstream of the winding station (S5) and is configured to weld two opposite ends of the helical antenna (11) against the two electrical contacts (12) of the integrated circuit (10).

* * * * *